(12) United States Patent
Mummidi

(10) Patent No.: US 10,965,624 B2
(45) Date of Patent: Mar. 30, 2021

(54) TARGETED AUTO-RESPONSE MESSAGING

(71) Applicant: MICROSOFT TECHNOLOGY LICENSING, LLC, Redmond, WA (US)

(72) Inventor: Lakshmi Narayana Mummidi, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/394,896

(22) Filed: Apr. 25, 2019

(65) Prior Publication Data

US 2020/0344183 A1 Oct. 29, 2020

(51) Int. Cl.
*G06F 15/16* (2006.01)
*H04L 12/58* (2006.01)
*G06N 20/00* (2019.01)
*H04L 29/08* (2006.01)

(52) U.S. Cl.
CPC ............ *H04L 51/02* (2013.01); *G06N 20/00* (2019.01); *H04L 51/28* (2013.01); *H04L 67/36* (2013.01)

(58) Field of Classification Search
CPC ......... H04L 51/20; H04L 51/28; H04L 67/36; G06N 20/00
USPC ........................................................ 709/206
See application file for complete search history.

(56) References Cited

U.S. PATENT DOCUMENTS 7,552,185 B1 * 6/2009 Kirzner ................ G06Q 10/107
709/206
9,801,031 B2 * 10/2017 Peng ................... H04L 65/4061
2004/0177271 A1 * 9/2004 Arnold ................ G06Q 10/107
713/154
2010/0175103 A1 * 7/2010 Walter .................... H04L 51/12
726/1
2010/0198931 A1 * 8/2010 Pocklington ......... G06Q 10/107
709/206
2019/0058684 A1 * 2/2019 Morrison ............ G06F 16/9535

FOREIGN PATENT DOCUMENTS

WO 2019027549 A1 2/2019

OTHER PUBLICATIONS

"International Search Report and Written Opinion issued in PCT Patent Application No. PCT/US20/025627", dated Jun. 4, 2020, 12 Pages.

* cited by examiner

*Primary Examiner* — Alan S Chou
(74) *Attorney, Agent, or Firm* — Newport IP, LLC; Benjamin A. Keim

(57) ABSTRACT

The techniques disclosed herein improve existing communication systems by automatically generating auto-response notices when a message to a user is related to a group with which the user is no longer a member. For example, after changing groups within a company, the user may still receive numerous messages related to the former group. Messages intended for this user may then be identified as related to a group with which the user is no longer associated based on the identity of the sender, other recipients of the message, the contents of the message, and a message context. The system may present an auto-response notice to the sender while the message is being drafted and before it has been sent. The auto-response notice alerts the sender of the changed group affiliation of the user.

20 Claims, 18 Drawing Sheets

TARGETED AUTO-RESPONSE MESSAGING

BACKGROUND

There are a number of different messaging tools such as email, instant messaging, collaboration boards, and the like, that allow users to communicate. In one illustrative example, some systems allow users to post messages to a channel having access permissions for a select group of individuals for the purposes of enabling team-focused or subject-focused conversations. Some email programs also provide a number of features that allow users to efficiently communicate with team-focused or subject-focused threads.

Although there may be a number of different systems that allow users to communicate team-focused or subject-focused messages, some existing systems have a number of drawbacks. For instance, when a user leaves an organization, changes roles within an organization, or moves to another team within an organization, some messaging tools do not effectively communicate such changes to all users. For example, when a person moves from one team within a company to a different team, oftentimes, users who communicate with that person are not notified about the move until a message is sent to that person and a reply message indicating the move is generated and returned. This is an inefficient process because the person who moves receives, and the system processes, potentially superfluous messages that may not be relevant to a recipient's new role.

A user may wish to stop or at least minimize messages related to a group with which he or she is no longer associated. However, these messages do not have the characteristics of spam because they are messages that, at a previous time, the user wished to receive. The messages may also come from senders with whom the user wishes to maintain communication. Therefore, blocking individual senders is not desirable. Additionally, there may be some messages that are related to the user's former group but are still relevant to the user (e.g., follow-up questions specific to the user, farewell messages, etc.). Conventional techniques for blocking, filtering, or automatically responding to messages do not provide a level of subtlety or targeting that can appropriately handle messages related to a former group of a user. A user may manually respond to each message indicating that he or she is no longer with the group, but this is inefficient and can lead to loss of productivity for the user as well as increased consumption of computing resources such as processing cycles, bandwidth, and memory.

SUMMARY

The techniques disclosed herein describe a targeted auto-response technique for responding to messages directed to a user that pertain to subject matter of a group with which the user is no longer associated. The targeted auto-response may be triggered by detecting a change in the user's position within an organizational structure. For example, a user may move within a company from a first team that is doing work related to printers to a second team that is doing work related to software. After the move, the user's email address and other contact information (e.g., instant messenger, chat, etc.) may remain the same. Thus, use of "reply all," group lists, auto-complete features, and other aspects of messaging tools may result in the user continuing to receive numerous messages about the group with which he or she is no longer associated. Moreover, in large organizations or large groups it may not be possible for every participant to keep track of which users have moved and who is currently a member of a group.

By automatically identifying an organizational change of a recipient of a message, or by identifying messages that are directed to a group with which the user is no longer associated, drafters of those messages may be alerted either before or during composition of the message. In some configurations, a drafter of a message can be notified by the use of a pop-up notification indicating the organizational change of the recipient in response to the receipt of an identity of the recipient. This notification may be presented to the drafter of the message before the message is sent or even before composition of the message. By notifying the drafter of the organizational change of the recipient, the drafter can choose not to send the message. This reduces usage of computing resources such as processing power because the drafter is informed of the organizational change prior to writing the entire message. Reducing processor usage also reduces energy consumption which is particularly beneficial for mobile devices powered by batteries. Moreover, by informing the drafter of the organizational change of the recipient prior to sending the message there is a reduction of network traffic and bandwidth savings.

One way for the system to determine that there was an organizational change for a recipient of a message is to query an organizational directory (e.g., a global address list (GAL)). The organizational directory may report that the recipient of the message has changed groups within the organization. In response to determining that a message is being directed to a user that has changed groups, the system can automatically display a message within the user interface the drafter is using to compose the message. By providing real-time notification to the drafter of a message, this allows him or her to forego sending the message to the recipient. This may save the drafter time because he or she does not spend time writing the entire message. In addition, this can save a number of computing resources because the message is not sent to the recipient.

In some configurations, a system can generate an auto-response notice based on one or more characteristics of the message and on the organizational change of a particular recipient. The characteristics may be analyzed to determine if the content or purpose of the message is related to a former group of the recipient. One technique for the system to classify a message as being related to a former group is scoring the message according to data contained within the message. Data from outside the message that provides context for the data contained within the message may also be used for scoring. Scoring may be implemented by comparing the score assigned to a message with a threshold and identifying the message as being related to a former group if the score exceeds the threshold. The various factors used to score a message may be differentially weighted to emphasize some factors over others in order to improve classification accuracy.

In an implementation, the classification may be performed by a machine learning classifier such as a neural network or support vector machine (SVM). One source of data for the classifier may be feedback from the recipient identifying messages he or she receives as being related to a former group. By scoring messages for a recipient with respect to one or more former groups of the recipient and then comparing the scores to a threshold, the system may be able to determine whether to display an auto-response notice for any particular message directed to the recipient.

The efficiencies derived from the techniques described above can lead to more efficient use of computing systems. In particular, by automating processes for generating auto-response notices, user interaction with the computing device can be improved in part by reducing inadvertent user input that may arise if the user manually sends messages informing others that he or she is no longer part of a group. Informing users while drafting messages (e.g., through a pop-up alert or similar mechanism) that the intended recipient is no longer part of a given group can reduce the total number of messages sent and received which reduces communication traffic freeing up network bandwidth for other data and reduces storage demands because there are fewer messages to store. If the message sender aborts sending during drafting a message, this reduces network traffic between the sender's computing device and a communications router, such as an email server, and also reduces the number of incoming messages the communications router must process and store. This can directly lead to more efficient use of computing resources such as memory, network bandwidth, processing power, etc. because there are fewer unwanted messages moving through the system.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
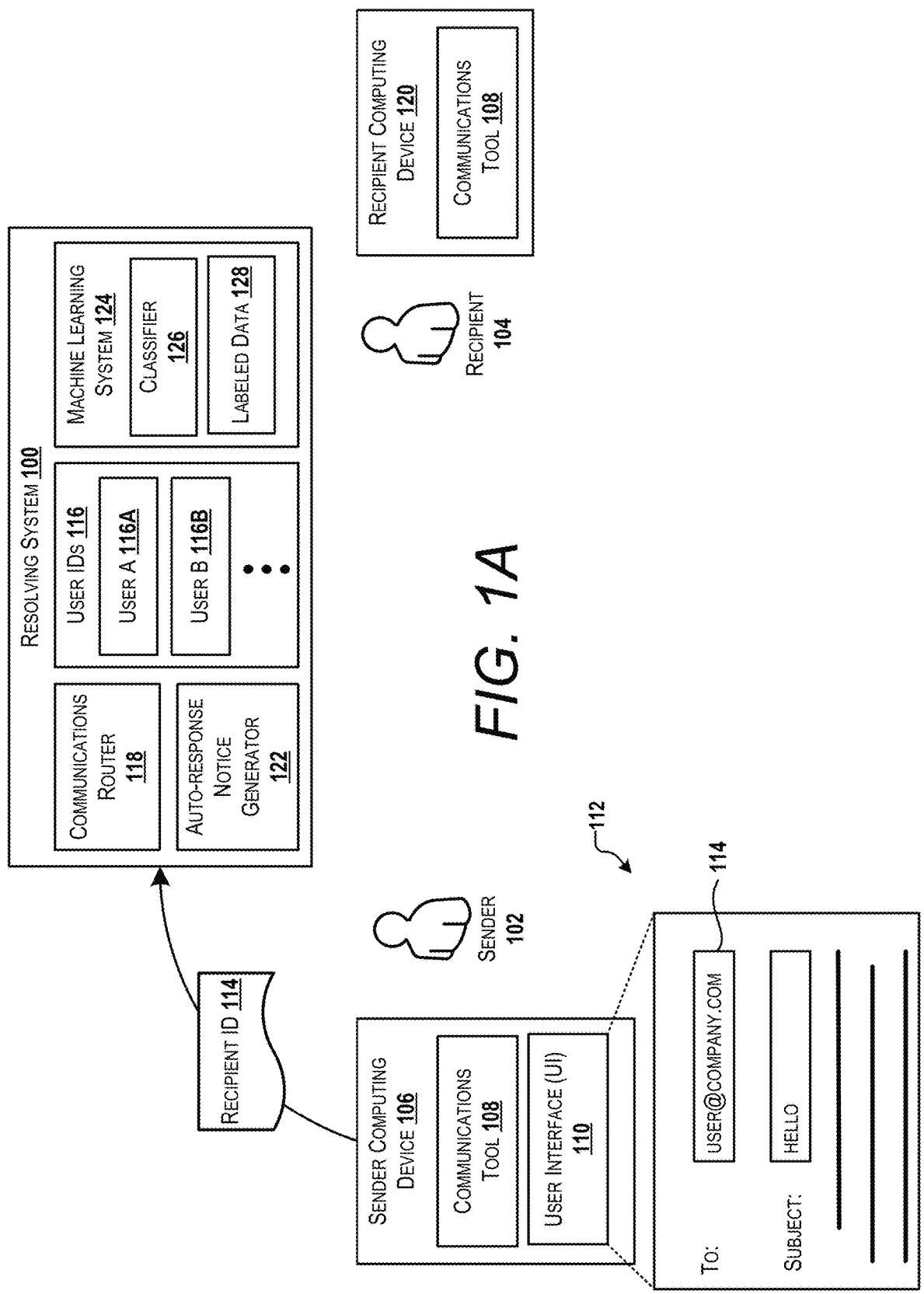
FIG. 1A illustrates a system in which a sender communication device identifies a recipient of a message to a resolving system as the message is being drafted.

FIG. 1A illustrates a resolving system 100 in an example scenario for illustrating aspects of the present disclosure. The resolving system 100 and related techniques disclosed herein improve existing communication systems by automatically generating auto-response notices when a sender 102 sends or composes a message to a recipient 104 that pertains to subject matter of a team or group with which the recipient 104 is no longer a member.

The sender 102 interacts with a sender computing device 106 that may be any type of computing device such as a desktop computer, laptop computer, a handheld computing device, a smart speaker, a smart television, a gaming system, or the like. The sender computing device 106 includes at least one communications tool 108. The communications tool 108 may be an email client or other application for composing and sending messages to other users. Examples of the communications tool 108 also include, without limitation, a collaboration application, a chat application, an instant messaging application, a voicemail application, or the like. The communications tool 108 may be implemented as software locally installed on the sender computing device 106 or as a web-based application or remote application that is hosted elsewhere. The sender computing device 106 also includes a user interface (UI) 110. The UI 110 may display UI content 112 generated in part by the communications tool 108.

The sender 102 provides a recipient identifier (ID) 114 to the communications tool 108. The recipient ID 114 identifies the recipient 104 as a recipient for a message. The format and information contained in the recipient ID 114 may vary based on the type and requirements of the communications tool 108. For example, the recipient ID 114 may be an email address for an email client. Alternately, it may be a phone number for a messaging application. Additionally, a user ID may be used for a company chat system.

The sender computing device 106 provides the recipient ID 114 to the resolving system 100. The resolving system 100 may be implemented on one or more server computers located remotely from the sender computing device 106. For example, the resolving system 100 may be part of a system for processing messages such as an email server. Thus, the resolving system 100 may be implemented as a cloud-based system that is distributed across multiple separate pieces of hardware at a single or at multiple physical locations. However, in other implementations all or part of the resolving system 100 may be located on the sender computing device 106. The resolving system 100 may be included, at least in part, in the communications tool 108. For example, the resolving system 100 may be included as part of an email client or as a plug-in to an email client or other communications tool 108.

The resolving system 100 may include a list of user IDs 116 such as an ID for user A 116A, for user B 116B, etc. The user IDs 116 may correlate multiple separate recipient IDs for the same person to a single user ID 116. For example, the email address of recipient 104 may be correlated to a unique employee identification number, an internal phone number, a mobile phone number, a collaboration platform username, etc. This enables identification of group memberships without limitation due to the particular recipient ID 114 received by the resolving system 100.

The resolving system 100 may include a communications router 118 that handles the processing and forwarding of the message received from the sender computing device 106. In an implementation, the communications router 118 is an email hosting system, a chat system, a collaboration board management system, or the like. Thus, the "back-end" processing needed to deliver a message from the sender computing device 106 to a recipient computing device 120 of the recipient 104 may be handled by the communications router 118. In an implementation, the communications router 118 may provide the message from the sender 102 to another system (not shown in FIG. 1A) such as an email server that handles the routing and delivery of the message.

An auto-response notice generator 122 within the resolving system 100 may determine when it is appropriate to generate an auto-response notice and may provide the auto-response notice to the sender computing device 106. The resolving system 100 may also include a machine learning system 124 that is capable of learning which messages are associated with which group and interfacing with the auto-response notice generator 122 to generate auto-response notices when appropriate. The machine learning system 124 may be implemented using a classifier 126 that classifies messages according to the group with which the message is most likely associated. The classifier 126 may be implemented as a perceptron, naïve Bayes, decision tree, logistic regression, K-nearest neighbor, artificial neural network, support vector machine (SVM), or any other type of machine learning classifier that currently exists or is later developed. The machine learning system 124 may be implemented as a system that performs supervised learning and the labeled data 128 used for the supervised learning may be included within the machine learning system 124.

Figure 1B:
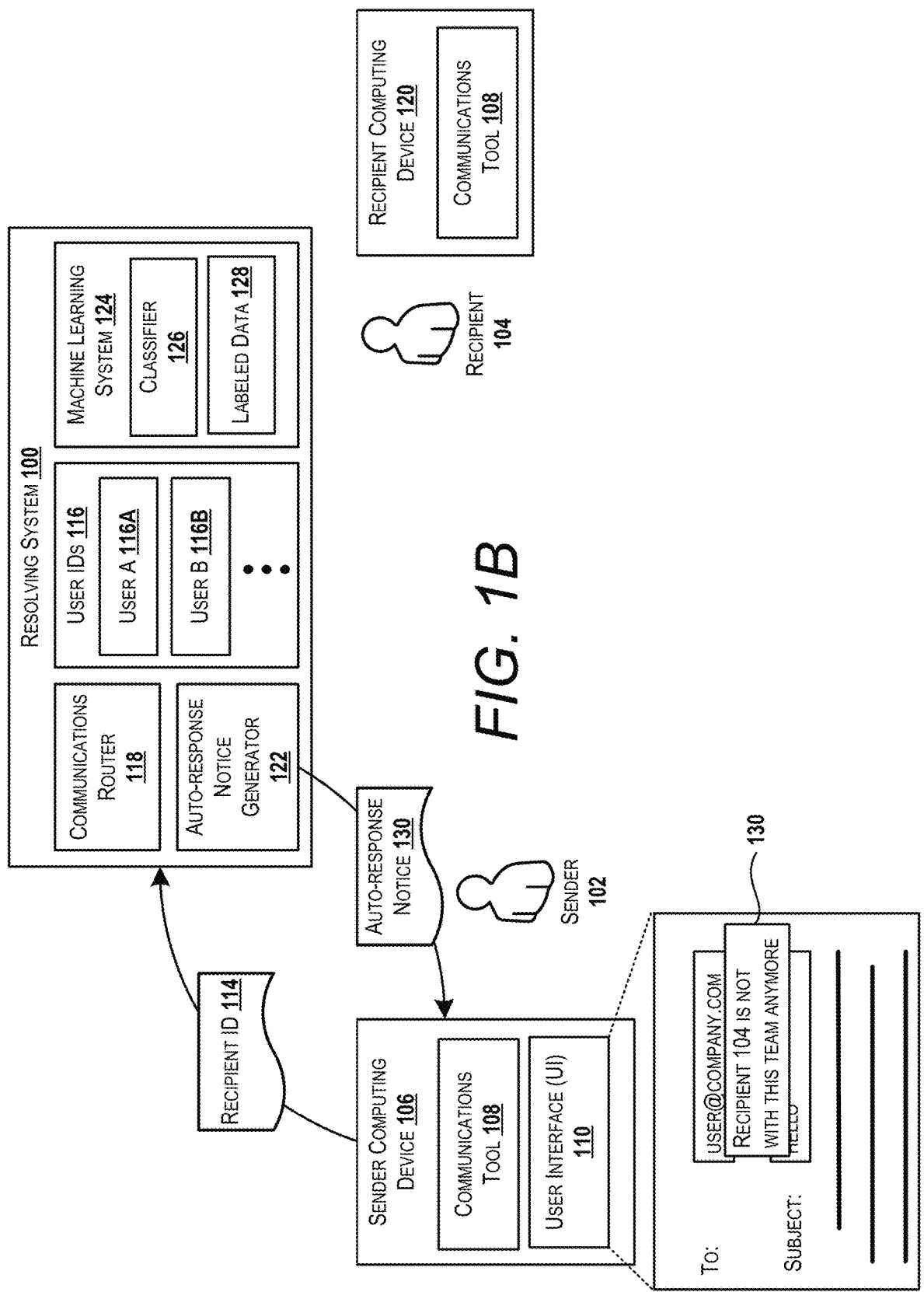
FIG. 1B illustrates the resolving system providing an auto-response notice to the sender computing device.

FIG. 1B shows the resolving system 100 providing an auto-response notice 130 to the sender computing device 106. The auto-response notice 130 may be a default message that includes a standard content which is suitable for multiple different users. For example, the auto-response notice 130 may include a statement that the recipient 104 is no longer associated with the former group. The recipient 104 may also customize the auto-response notice 130 so that it provides more or different content than the standard message. For example, the auto-response notice 130 may be context-dependent and have content that varies based on the identity of the group to which the message is directed. In an implementation, the auto-response notice 130 may provide contact information for another individual who is still a current member of that group.

In an implementation, the auto-response notice 130 is a separate message sent from the auto-response notice generator 122 to the sender computing device 106. The form of the auto-response notice 130 may be the same as that of the message sent by the communications tool 108 of the sender computing device 106. Thus, if the sender 102 sends an email to the recipient 104, the auto-response notice 130 may also be an email. However, in other implementations the auto-response notice 130 may be included in the UI 110 of the sender computing device 106 in a prominent location such as proximate to a portion of the UI 110 in which the sender 102 has entered the recipient ID 114. This may be implemented as a "pop-up" that informs the sender 102 about the status of the recipient 104 as no longer being a member of the group.

When the auto-response notice 130 is provided in the UI 110 during drafting of the message, this provides the sender 102 with an opportunity to change the recipients for the message or to abandon the message. Alternatively, the sender 102 may continue sending the message to the recipient 104 knowing that the role of the recipient 104 has changed.

Figure 1C:
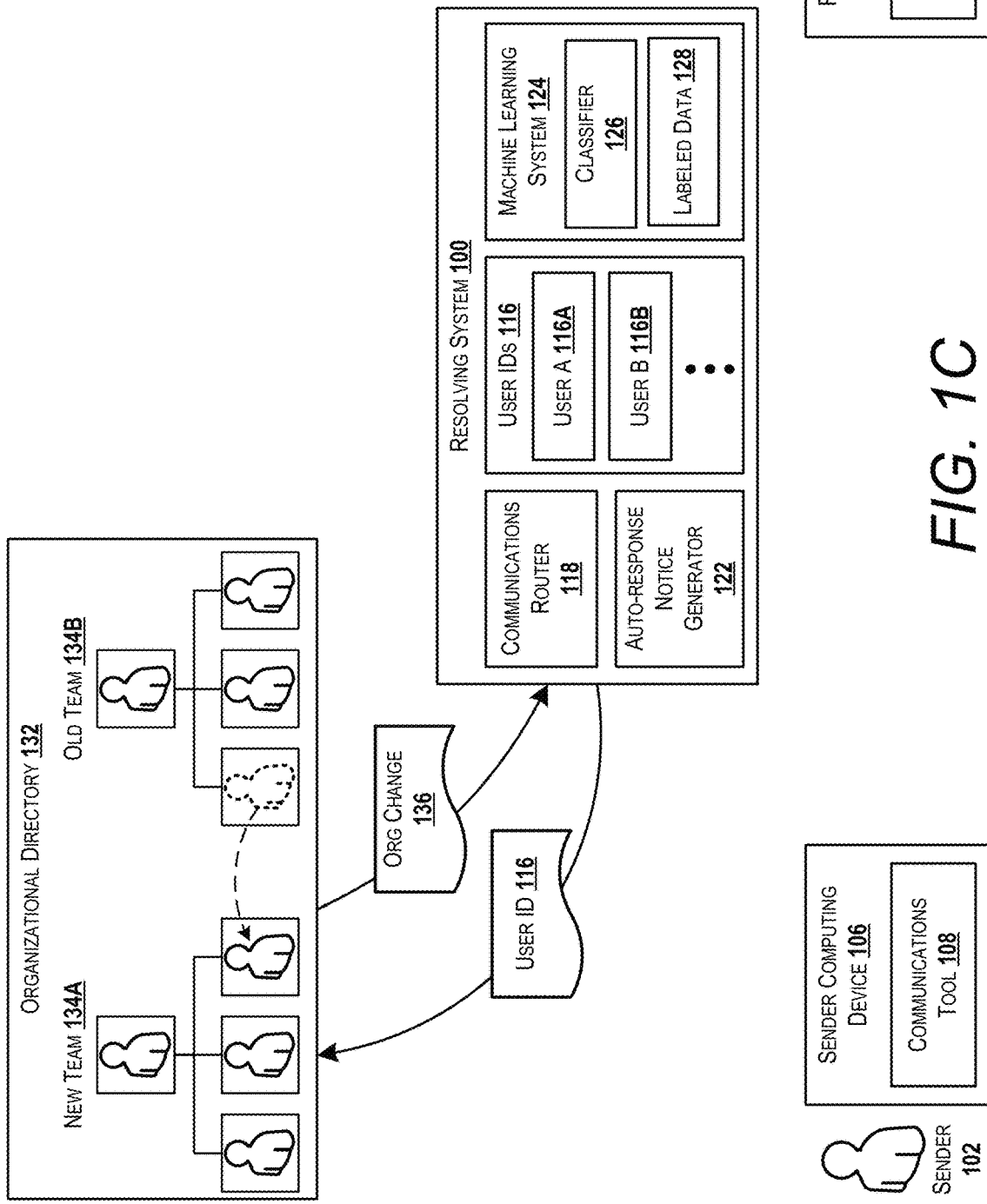
FIG. 1C illustrates the resolving system querying an organizational directory with a user identifier and receiving information about an organizational change associated with the user identifier.

FIG. 1C shows the resolving system 100 sending a user ID 116 corresponding to the recipient 104 to an organizational directory 132 to query if there is been a change in organizational status for the recipient 104. The resolving system 100 may use one or more external resources to make a determination regarding an auto-response notice 130. The organizational directory 132 is one example of an external resource.

The organizational directory 132 may be implemented as any type of directory that maintains a record of relationships, hierarchies, and associations within an organization. In some implementations, the organizational directory 132 may be implemented as part of a communication system such as an active directory used for email and other messages within an organization. For example, the organizational directory 132 may be implemented as a global address list (GAL) which is an electronic shared address book that contains all or most of the people of an organization and their relationships with other individuals within the organization. The resolving system 100 may use the Lightweight Directory Access Protocol (LDAP) to communicate with the GAL via a communications network.

The organizational directory 132 may include organizational structures such as a list of members and hierarchy for employees within various teams 134. In this example, a team may be synonymous with a group. Thus, the organizational directory 132 may show that the recipient 104 has moved to a new team 134A from an old team 134B. When a user moves within an organization the reporting structure may change and that may be reflected in the organizational directory 132 which activates the auto-response notice generator 122.

In response to a query from the resolving system 100, the organizational directory 132 may provide a notification of organizational change 136. The request for organizational change status may include sending the user ID 116 to the organizational directory 132. Receipt of the user ID 116 itself may be sufficient to communicate to the organizational directory 132 that the requested response is an identification of any organizational change 136 associated with that user ID 116. The notification of the organizational change 136 may indicate the team that the recipient 104 left and the team that he or she joined.

If the resolving system 100 queries the organizational directory 132 with a user ID 116 associated with a user who has not changed teams, the organizational directory 132 may respond with a notification that there is no organizational change for the user. The status of a user as having changed teams may be based on a length of time since the change. For example, the organizational directory 132 may provide an organizational change 136 response indicating that a user has changed teams or groups for a set period of time following the change. For example, the notification may be provided for one month, three months, six months, or a different length of time. After this period of time has elapsed, the organizational directory 132 may respond to queries by indicating that the user has not changed position within the organization.

In an implementation, the recipient 104, may request that the length of time for receiving messages be extended. If, after the default period of time, the recipient 104 is still receiving messages related to the old team 134B, the recipient 104 may request to have the period of notification of organizational change extended, such as, for example, another three months.

Figure 1D:
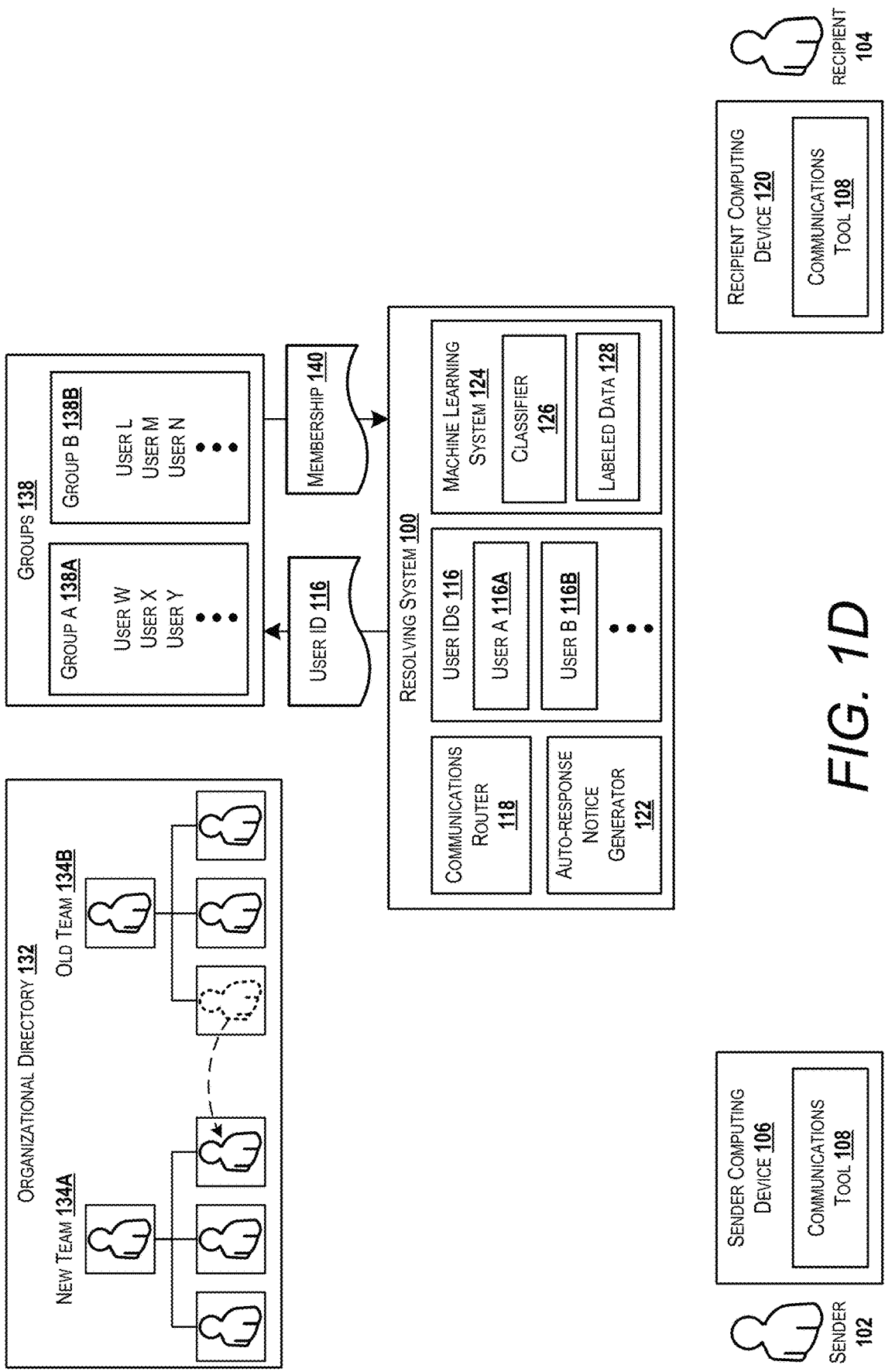
FIG. 1D illustrates the resolving system providing the user identifier to a directory of groups and receiving identification of which groups the user ID is a member.

FIG. 1D shows the resolving system 100 accessing another type of external resource, groups 138. The groups 138 may be collections of user IDs that are associated with a message thread or channel. For example, a group 138 may be implemented by a group email address that, when used, sends an email to all individual email recipients associated with that group email address. A group 138 may also be implemented as a message board that allows members to post messages and may provide notifications to members when a new message has been posted. The set of user IDs, email addresses, or other recipient IDs used to define a group 138 may be managed by a moderator or administrator. For example, the groups 138 may be associated with teams such as one or more of the new team 134A or the old team 134B.

The groups 138 may include, for example, a Group A 138A that includes multiple users and a Group B 138B that includes a different set of multiple users. Individual users may be members of one or more groups and different groups may have common users. The user ID 116 provided by the resolving system 100 may be compared with group membership to identify those groups 138 that include the recipient 104 as a member. Identification of the groups with which users belong may be used to identify whether a message is related to the new team 134A or the old team 134B.

A notification of membership 140 may be provided from the list of groups 138 to the resolving system 100. The notification of membership 140 may indicate which groups the user ID 116 is associated with. This notification may be performed for all user IDs included in a message, not just the user ID 116 of the recipient 104. Comparing user IDs 116 to group membership is a way to determine if a message is sent to a group. The status of a message as targeted to a particular group can be leveraged to determine if the message is related to the old team 134B or the new team 134A.

Figure 1E:
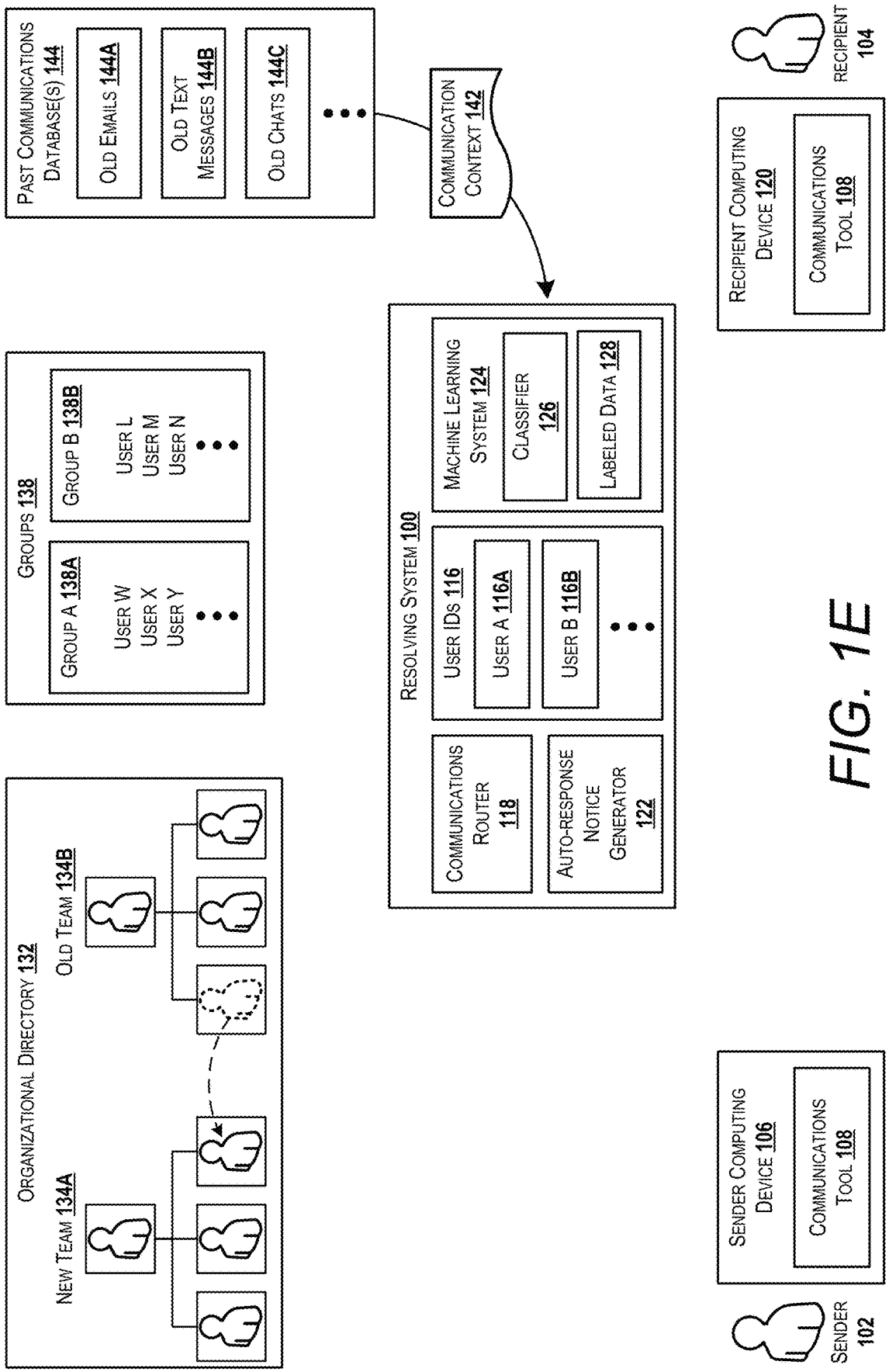
FIG. 1E illustrates a past messages database providing message context to the resolving system.

FIG. 1E shows the resolving system 100 receiving message communication context 142 from a past communications database(s) 144 which is a further example of an external resource. The past communications database(s) 144 may contain databases or records in which there are past messages such as old emails 144A, old text messages 144B, old chats 144C, and the like. The communication context 142 may provide additional information that the resolving system 100 can use to determine whether a message drafted by the sender 102 is related to a team or group with which the recipient is no longer a member.

The past communications database(s) 144 may provide an indication of which users belong to the same team or group. It may also indicate if two or more users have messages that are limited to the context of a particular team or group. For example, if two people collaborate on a project but otherwise do not interact, every message between all individuals in the past communications database(s) 144 may be related to that project. Thus, the resolving system 100 is able to infer that any such messages between those individuals are likely also related to that project. Alternatively, if the recipient 104 and another member of the old team 134B have a social relationship as well as a professional relationship, past messages between these users may include social communications as well as communications related to the work of the old team 134B.

The communication context 142 may be used as labeled data 128 for the machine learning system 124. Thus, past messages may be examples with which the classifier 126 can be trained.

Figure 1F:
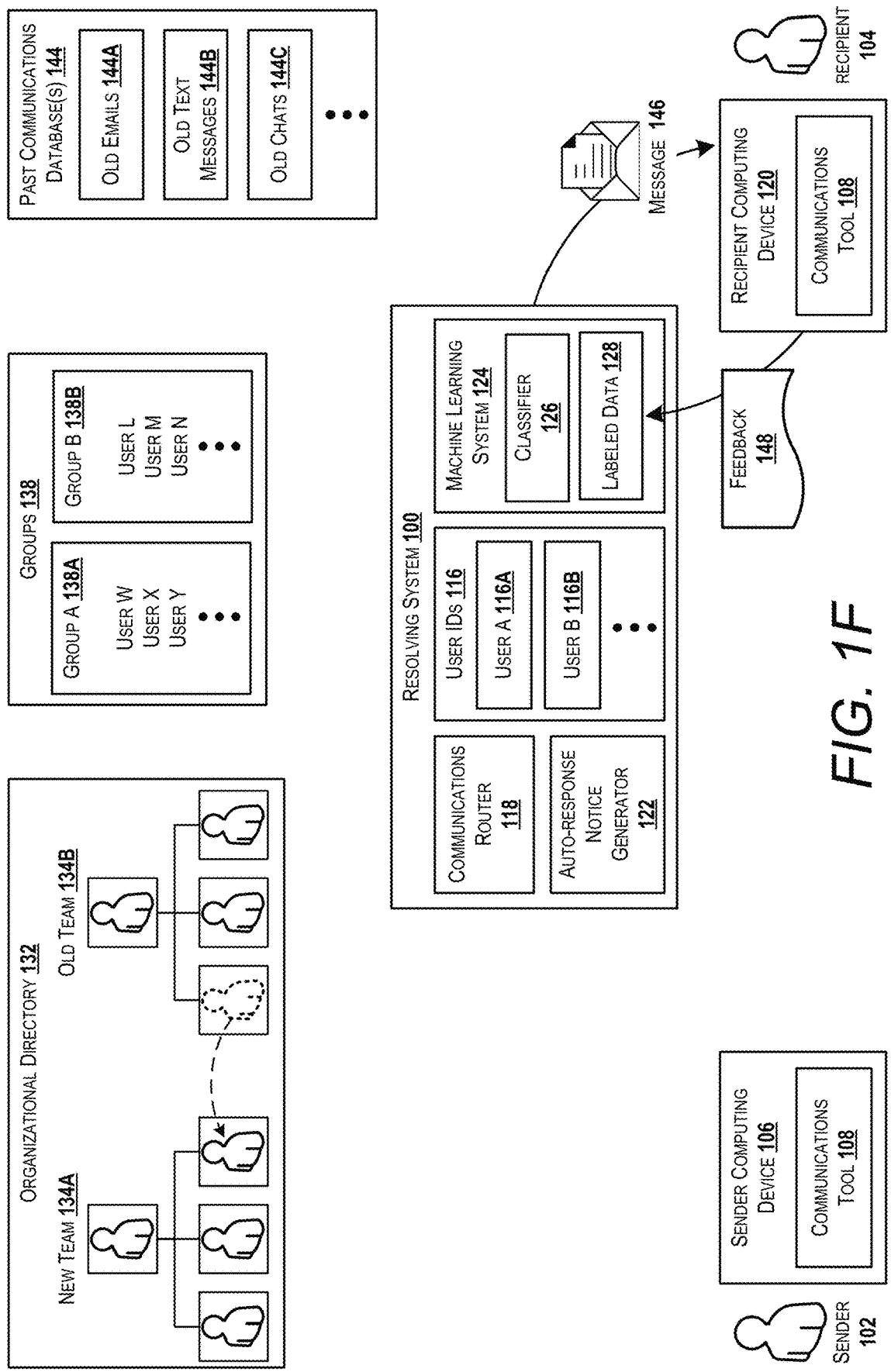
FIG. 1F illustrates the resolving system providing a message to a recipient computing device and receiving feedback related to the message.

FIG. 1F shows a message 146 sent from the resolving system 100 to the recipient computing device 120. The message 146 is the email or other type communication drafted by the sender using the communications tool 108 on the sender computing device 106. This message 146 is accessed using the communications tool 108 on the recipient computing device 120. The message 146 may be routed to the recipient computing device 120 in part by the communications router 118 of the resolving system 100.

Upon receiving the message 146 and accessing the message using the communications tool 108, the recipient 104 may provide feedback 148 regarding the message 146. The feedback 148 may indicate that the message 146 is one that the recipient 104 did not wish to receive because it is related to the old team 134B. The negative feedback may simply be an indication that the message 146 is not desired. Alternatively, it may be specific feedback indicating which team (i.e., the old team 134B) or group the message 146 is most closely associated with. This negative feedback may be provided to the machine learning system 124 as labeled data 128 that enables the machine learning system 124 to better predict which messages are related to the old team 134B or any other group to which the recipient 104 no longer belongs. The recipient 104 may also provide positive feedback 148 indicating that the message 146 is one that he or she wishes to receive and/or that the message 146 is not related to a former team or group. This positive feedback 148 may also be used as labeled data 128. Thus, machine learning implemented by the machine learning system 124 can iteratively adapt the resolving system 100 to improve its abilities to identify those messages for which an auto-response notice should be generated from the machine learning system 124.

In summary, the resolving system 100 obtains multiple types of data related to the message 146 and the recipient 104 that allow the resolving system 100 to determine whether it is appropriate to generate an auto-response notice. Starting with the recipient ID 114, the resolving system 100 is able to request information about an organizational change 136 from the organizational directory 132. The presence of an organizational change 136 may be a threshold or necessary condition for the auto-response notice generator 122 to generate the auto-response notice 130. Membership 140 information identifying which groups 138 the recipient 104 belongs to may also be provided to the resolving system 100. Furthermore, communication context 142 from past messages is also available to the resolving system 100. The membership 140 information and the communication context 142 are examples of external information that is not part of the message 146 itself but may be useful for classifying the message 146. Finally, feedback 148 from the recipient 104 enables the resolving system 100 to improve its ability to identify and classify messages.

The resolving system 100 shown in FIGS. 1A-1F can benefit user productivity and efficient use of computing resources in a number of ways. For instance, consider the following scenario and the technical benefits resulting from a system that provides targeted-auto response messages to users that are composing messages which are likely directed to a group or team with which one of the recipients is no longer associated. These undesired messages can consume network bandwidth and storage capacity on one or more computing devices. Moreover, they may be distracting and reduce productivity of the recipient. Additionally, the sender of such messages may not realize that his or her message was sent to a recipient who no longer works on the subject matter of the message.

For example, a user, Kevin, has changed jobs within his company. Previously, Kevin worked with a group that dealt with printers. This is his former group. Now he works with a group that develops software. This is his current group. However, Kevin continues to receive numerous emails, chat messages, collaboration board mentions (e.g., collaboration software such as Teams by MICROSOFT, Slack by SLACK TECHNOLOGIES, Workplace by FACEBOOK, etc.), and other messages related to his former group. Many of these messages come to Kevin simply because the sender does not remove Kevin's email address or other identifier when replying to a previous message. Some messages come to Kevin because his contact information is still included within the list of members associated with a communications group that was part of his former group. Other messages may come from internal or external sources that simply do not know Kevin has changed teams.

Kevin no longer wishes to receive messages that relate to his former group. However, he still wishes to be able to communicate with members of his former group about subjects other than the work of the "printer team" such as general company issues, personal messages, and the like. Kevin may also continue to communicate with some internal and external individuals or groups as part of his work with his current group. For example, there may be an external vendor that Kevin interacted with as a member of his former group and that he still wishes to interact with, perhaps in a slightly different way, as a member of his current group. Furthermore, there may be some group communications that are relevant to both Kevin's role as a member of his former group and his current group such as, for example, a group related to the company softball team of which Kevin remains a member.

Kevin can reply to individual messages he receives that relate to his former group to inform the sender that is no longer part of that group. This may be effective for that individual sender, but other members of the former group may continue to send Kevin messages such as, for example, by using reply all to a previous email that included Kevin. Additionally, different technologies for communicating such as email and chat may require Kevin to contact the same person through multiple communication tools in order to prompt the person to remove his contact information from each form of communication. Other communication tools, such as group communication channels, may require an administrator or engineer to modify the list of subscribed members. For these types of communication tools, simply replying to the sender may not be sufficient to have Kevin's identity removed from the group.

Thus, Kevin faces significant challenges if he wishes to manually communicate with all the appropriate individuals through all the different communication channels that he is no longer a part of the former group. Sending out these notifications manually is not always a scalable or feasible solution. Additionally, removing unwanted messages (i.e., messages to individuals related to their previous teams) from the communication system frees up bandwidth for other data, reduces the computational load on computers processing, routing, and analyzing the messages, and reduces the need for storage space for the unwanted messages.

Kevin will benefit from a system that recognizes his organizational change from one group to another and automatically triggers a response based on the move. Kevin will also be helped by a manual setting in which he can select the groups for which he wishes to set up auto-response notices. The following disclosure provides techniques to send auto-response notices, emails, etc. for specific groups, teams, etc. following the move of a user from one group within an organization to another.

Figure 2:
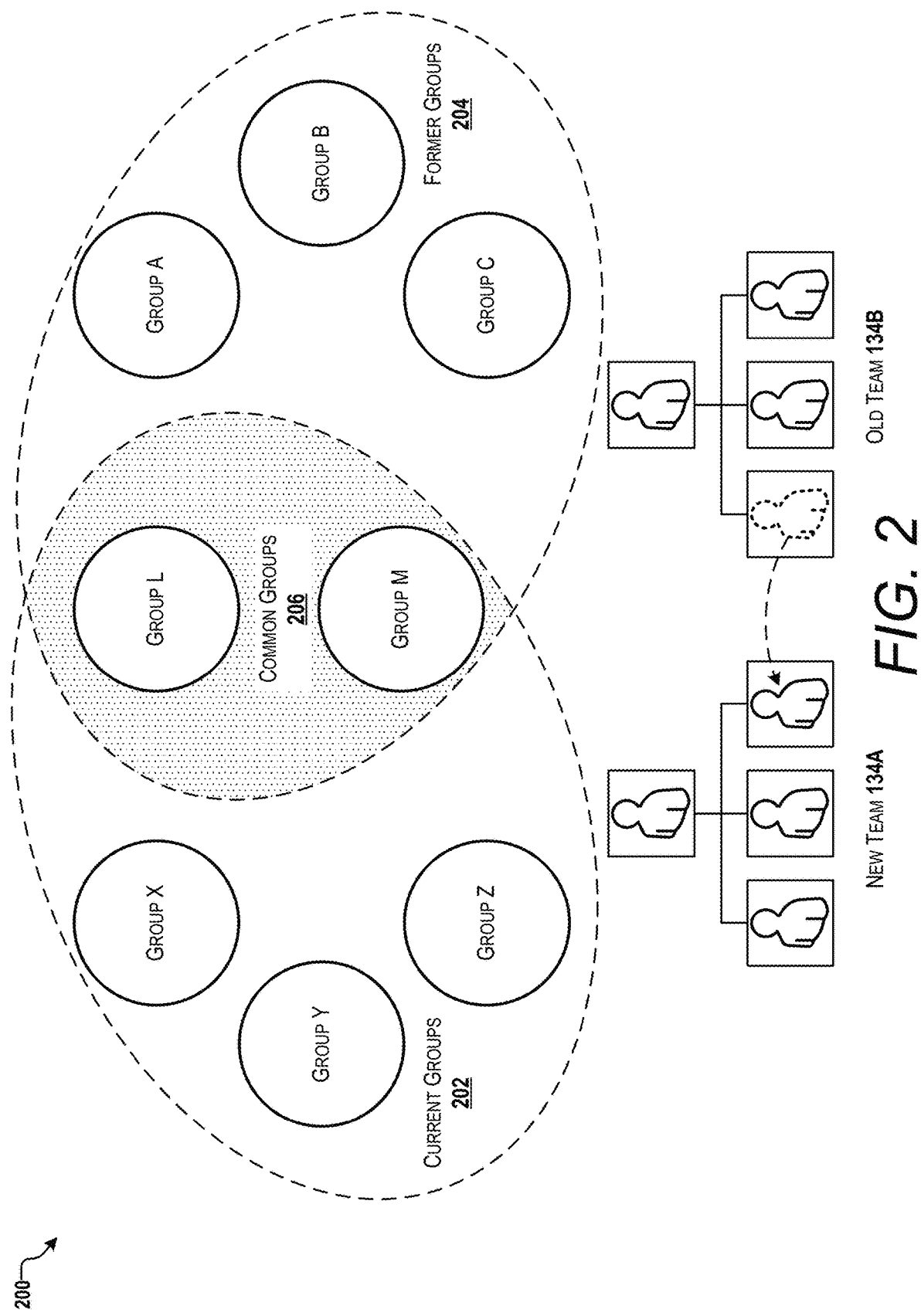
FIG. 2 illustrates relationships between multiple different groups and two separate teams.

FIG. 2 shows a diagram 200 illustrating a set of current groups 202 associated with or belonging to the new team 134A and a set of former groups 204 that are associated with or belong to the old team 134B. The groups shown in FIG. 2 may be the same groups included in the list of groups 138 shown in FIGS. 1D-F. The current groups 202 may include, for example, Group L, Group M, Group X, Group Y, and Group Z. A team or individual user may be associated with one or groups by being a member of one or more groups. If a team is a member of a group, all users who are part of that team 134A may be included in the group by virtue of being included in the team. A team may also own one or more groups. Ownership of a group indicates the ability to add or remove participants.

The former groups 204 may include Group A, Group B, Group C, Group L, and Group M. Group L and Group M are common groups 206 that are associated with both the new team 134A and the old team 134B. The common groups 206 may be groups related to topics or purposes that are relevant to both the new team 134A and the old team 134B. For example, the common groups 206 may be related to general employee issues or administrative matters that are relevant to all teams within the organization or company.

Determining if a message is related to the old team 134B or the new team 134A may be inferred by the group to which the message is directed. The message may be explicitly sent to a group through the use of a group email, a group channel, or other technique that directs the message to individual users based on membership in the group.

Alternatively, a message may be determined to be directed to a group based on an inference derived from the identity of the recipient of the message and the membership of those users in the group. For example, the list of groups 138 shown in FIGS. 1D-F may include lists of users within individual groups such as Group A 138A or Group B 138B. If a message is directed to a set of users that is the same or substantially the same as the list of members in a group, then the message may be determined to be directed to the group. For example, the determination may be based on the set of recipients for the message including at least 85%, at least 90%, or at least 95% of the members of the group. Additionally, the determination may be based on the set of recipients for the message including no more than 5%, 10%, or 15% percent of recipients that are not members of the group. Additional considerations such as the content of the message may be used to determine if it is directed to the group or not. For example, inclusion of the name of the group in a title or first line of the message may be interpreted as an indication that the message is directed to the group.

For a user who has moved from the old team 134B to the new team 134A, any messages directed to one of the groups that are only associated with the old team 134B (i.e., the former groups 204 excluding the common groups 206) may be classified as being related to the old team 134B. This classification may result in the auto-response notice generator 122 generating an auto-response notice. Messages directed to one of the current groups 202 including the common groups 206 may be interpreted as being related to the new team 134A and would not trigger an auto-response notice.

The groups that trigger an auto-response notice may be customizable by the user. Thus, in an implementation the user can indicate that any messages to the user that are determined to be a message to a selected group, will result in the generation of an auto-response notice. This provides the user with greater control over the criteria for generated auto-response notices based on groups. For example, if the recipient 104 of FIG. 1 considers Group L to be related to the work of his or her old team 134B, even though Group L may be designated as a common group 206, the recipient 104 can indicate that auto-response notices should be generated for any messages related to Group L. Similarly, if the recipient 104 wishes to continue participating in Group A, he or she may choose to not send auto-response notices when included on messages to this group.

Figure 3:
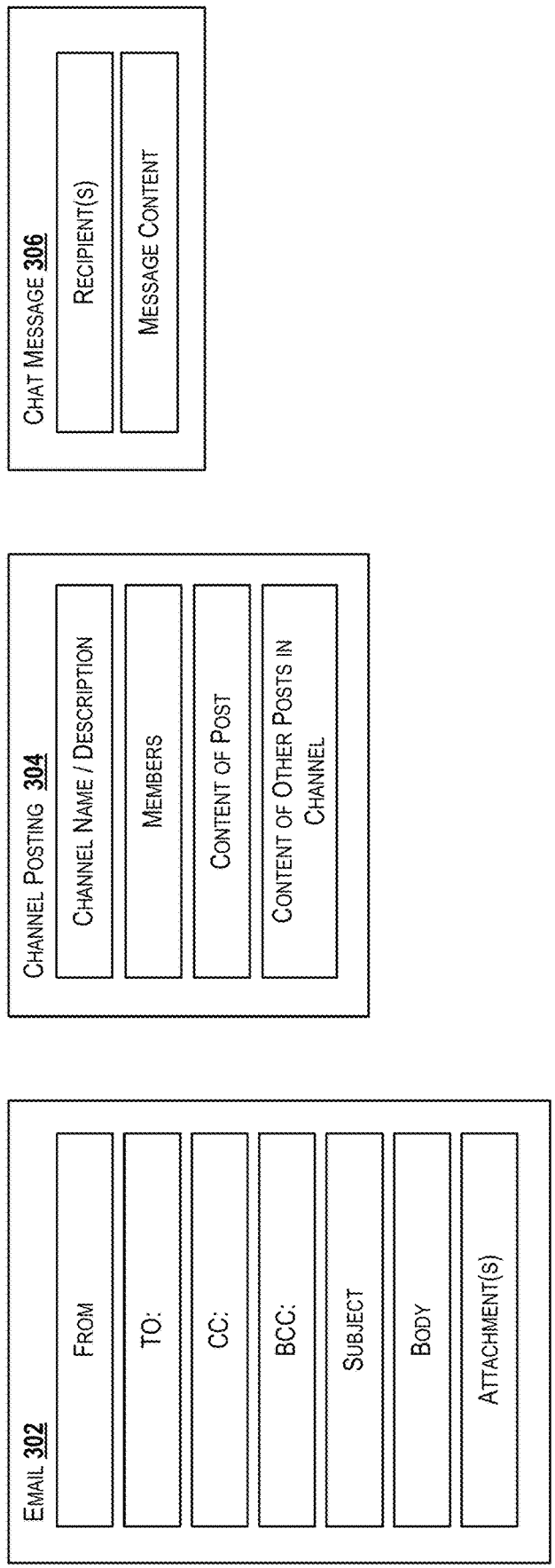
FIG. 3 illustrates example data structures for various types of messages.

FIG. 3 illustrates example data structures for various types of messages 300. The resolving system 100 may be used with any type of message which conveys a message such as text, audio, images, video, etc. from a first user to a second user and is not limited to the examples provided herein. The example data structures for messages 300 show data structures for an email message 302, a channel posting 304, and a chat message 306.

An email message data structure 302 includes data indicating a sender of the email. This data is often found in the From field of an email. During composition of an email the setting of a communications tool 108 such as an email client may indicate the sender. The email data structure 302 also identifies one or more recipients in one or more fields such as a "To" field, a "Cc" (carbon copy) field, and/or a "Bcc" (blind carbon copy) field. The specific recipient field used for the email address of the recipient 104 may be considered when determining if an auto-response notice should be sent. For example, if the email address of the recipient 104 is included in the "To" field it may be less likely to send an auto-response notice. The probability of sending an auto-response notice may increase if the email address of the recipient 104 is in the "Cc" field or in the "Bcc" field. This differential consideration of the separate recipient fields within the email message data structure 302 may be implemented through scoring and giving a higher score (where a higher score correlates with a higher likelihood of sending an auto-response notice) to an email address in the "Bcc" field, a lower score to an email address in the "Cc" field, and the lowest score to an email address in the "To" field.

Another type of data in the email message data structure 302 is the "Subject" of the email message which may be included as a subject line. Content that is included as a subject of an email (e.g., text in the subject line) may be analyzed to determine if the email is related to a particular group or team. Similarly, content included in the "Body" of an email may also be analyzed to determine the subject matter of the email and identify any relationship to a group or team. Analysis of the text in the "Subject" and "Body" may be performed by any suitable textual analysis technique such as keyword identification or natural language processing (NLP). Content of the "Subject" may be given more weight than content of the "Body".

Any "Attachments" to the email may also be considered when determining if sending of the email should trigger an auto-response notice. The names of attached files, file types, and content of the files (e.g., textual content) may be analyzed to determine if the email is related to a group or team.

Another example type of message is a channel posting 304. A channel posting 304 may be content added to a group collaboration tool in which multiple users contribute content that is available to all other members of the channel. In some implementations a channel may be similar to a blog, wiki, or other collaborative electronic document. A channel posting 304 includes a channel name or description. The channel name may clearly indicate an association with a group or team with a name such as "Group A channel" or "Printer team."

Each channel has subscribed members who are able to view and may also (but not necessarily) be able to contribute content to the channel. The set of subscribed members may be implemented as a list of user IDs. In some instances, the members subscribed to a channel may be the same or nearly the same as the set of members who are included in a team or group. Determining that a channel has the same (or similar) members as a team or group is an indication that the channel may be associated with the team or group.

The content of a post in a channel represents the post currently being drafted by the sender 102 or the post most recently provided by the sender 102. The content of the post may be analyzed to determine the subject matter of the post and any relationship to a team or group. Additionally, a channel may maintain some or all of the past posts and other content contributed to that channel. The content of other posts in the channel may be evaluated to determine the topics and content that are included in the channel. This provides a broader perspective and more data on the subject matter of the channel than just evaluating the content of the current or most recent post. The content of other posts in the channel may be weighted less heavily than the content of the post by the sender 102 when determining if the channel is related to a group or team.

A third example type of message, a chat message 306, may have a data structure that includes the recipient(s) and the message content. A chat message 306 may include instant messenger and SMS messages. The recipients include the recipient 104 and may include additional recipients for group chats. The identities of the additional recipients may be analyzed to determine if there is any correlation with membership in a group or team. The message content may include text, emojis, pictures, and video. The message content may be analyzed such as by keyword identification or natural language processing to identify the subject matter of the message.

Additionally, the type of content (i.e., emojis, pictures, video, etc.) may be analyzed to identify patterns with other chat messages (e.g., old chats 144C that represent communication context) that are known to be associated with a team or group. For example, there may be no emojis in the old chats 114C for a particular group, so inclusion of an emoji suggests that the chat message 306 is not directed to that group. Additionally, there may be one team that frequently includes pictures in chat messages while another team frequently includes videos. The presence of a picture or alternatively of a video may suggest that the chat message 306 is more likely directed to one of the groups than the other.

In general, all types of data structures for messages 300 include communication participants (i.e., sender, recipient(s), channel members, etc.) and content (e.g., subject, body, attachment(s), the content of a post, or message content). Both may be analyzed to infer an association between a message and a group or team. An organizational directory 132 and/or a list of groups 138 may be queried to identify what teams or groups include individual ones of the communication participants. Additionally, communication context 142 from past communications database(s) 144 may be referenced to identify patterns or similarities between a message and past messages that are known to be related to a group or team.

Figure 4:
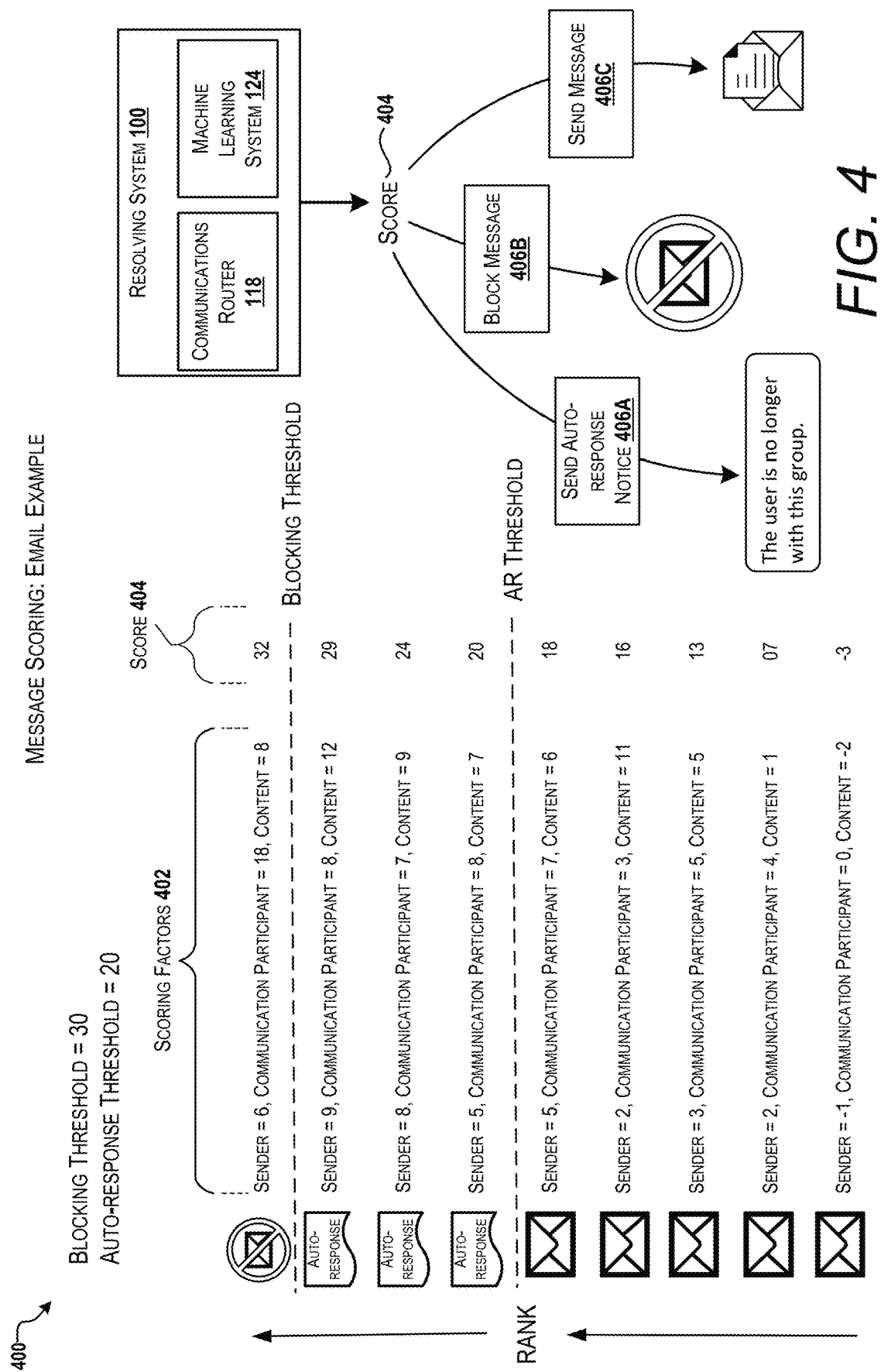
FIG. 4 illustrates an example of differentially processing email messages based on scores assigned to the email messages.

FIG. 4 shows an example of message scoring as applied to an email message. Messages, including but not limited to email messages, may be scored based on one or more scoring factors 402. In this example, the scoring factors 402 are the sender, the communication participant(s), and the content of the email. However, additional scoring factors 402 may be included and any of these illustrative scoring factors 402 may be omitted. The scoring may be performed by the resolving system 100 and may use the machine learning system 124 to assign a score and/or to determine a scoring threshold. The scoring produces a score 404 for individual email messages.

Generally described, each of the scoring factors 402 can be scored according to a likelihood that a message is related to a team or group with which the recipient is no longer associated. The scores can be based on any scale and may be positive or negative. The scores may be represented as a number such as, but not limited to, an integer number. The scores may be sorted to create a sorted list of emails based on the values of the respective scores. The score 404 may be an accumulative score that combines individual scores for separate features of the email messages. In one example, a positive score indicates a likelihood that the email message is related to a former group or team of the recipient. while a negative score indicates that the email message is likely associated with a current group or team of the recipient. A larger absolute value indicates a stronger likelihood for the scored factor, while a score of zero for a given characteristic of the email does not affect the probability of that email being classified as related to a former group or team of the recipient.

Although in this example each score is summed to create the accumulative score, it can be appreciated that any type of algorithm may be utilized to generate the score 404 based on the individual scores of the scoring factors 402. For example, scoring factors 402 may be normalized or weighted. Weighted scores may be used to generate an accumulative weighted score. The weights that are applied to each score can be based on a number of resources including but not limited to the machine learning system 124, definitions provided by the recipient 104, or settings provided by an administrator managing the resolving system 100. For example, different types of content may be weighted differently. The words, such as keywords, present in the subject line of an email message may be given more weight than the words in the body of that message.

The weighting may also be contextual and apply different weights to the same factor based on a set of conditions or rules. For example, if the recipient 104 is the only person receiving the email message, then the communication participant factor may receive a lower than typical or a 0 weight. Alternatively, if a particular sender is known to be strongly associated with a given group (e.g., based on communication context 142 from the past communications database(s) 144) then that sender may receive a higher weight when scoring email messages from that person. As an additional example, if the set of communication participants is the same as the set of members in a group or individuals shown in the organizational directory 132 as being part of the same team, then the weighting applied to the communication participant factor may be increased. Alternatively, if neither the sender nor the communication participants correlate strongly to any particular team or group, the weights for those two factors may be decreased, which has the effect of increasing the relative weighting applied to the content of the email message.

In this example, the score 404 is compared to one or more thresholds and the communications router 118 processes the email message differently based on the thresholds. The processing operations 406 for the communications router 118 include an auto-response notice 406A, a block message 406B, and a send message 406C. One threshold is used to determine whether an auto-response notice is sent. This auto-response threshold may be set, for example, at the value 20. Thus, email messages with a score 404 that is equal to or greater than 20 may trigger the resolving system 100 to send an auto-response notice 406A. As discussed above, the auto-response notice may be sent in reply to an email message that has been sent from a sender or the auto-response notice may be presented to the sender while he or she is still composing the email message.

Email messages that have a score 404 of less than 20 may be processed normally (i.e., without any type of auto-response activity) in which case the communications router 118 will then send the message 406C. Note that the score 404, when implemented as an accumulative score, may send some email messages normally even though the score for a given scoring factor 402 (e.g., a content score of 11) is the same or higher than the score for that factor on other email messages that do trigger an auto-response notice.

This example illustrates there is a second threshold referred to as a blocking threshold and assigned the value of 30. The blocking threshold indicates a score at or above which the sender is not permitted to send the message. For example, an attempt to send an email with the recipient's email address in it may be blocked based on a score exceeding the illustrated blocking threshold of 30. Thus, in this example the scoring occurs while the email as being composed. The blocking threshold may be set higher than the auto-response threshold so that only those email messages which are highly likely to be related to one of the recipient's former teams or groups are blocked. For an email message with a score above the blocking threshold, the communications router 118 may implement the processing of block message 406B.

Blocking messages may be an optional response that is selected by the recipient. Thus, in some implementations blocking may be turned off regardless of the score 404. Blocking may also be implemented as a type of escalation in response to activity or inactivity by a sender. For example, if the same sender repeatedly generates messages that trigger the generation of auto-response notices, blocking may be activated once some predetermined number of auto-response notices have been sent (e.g., after 1, after 2, after 5, etc. auto-response notices to the same sender).

Figure 5:
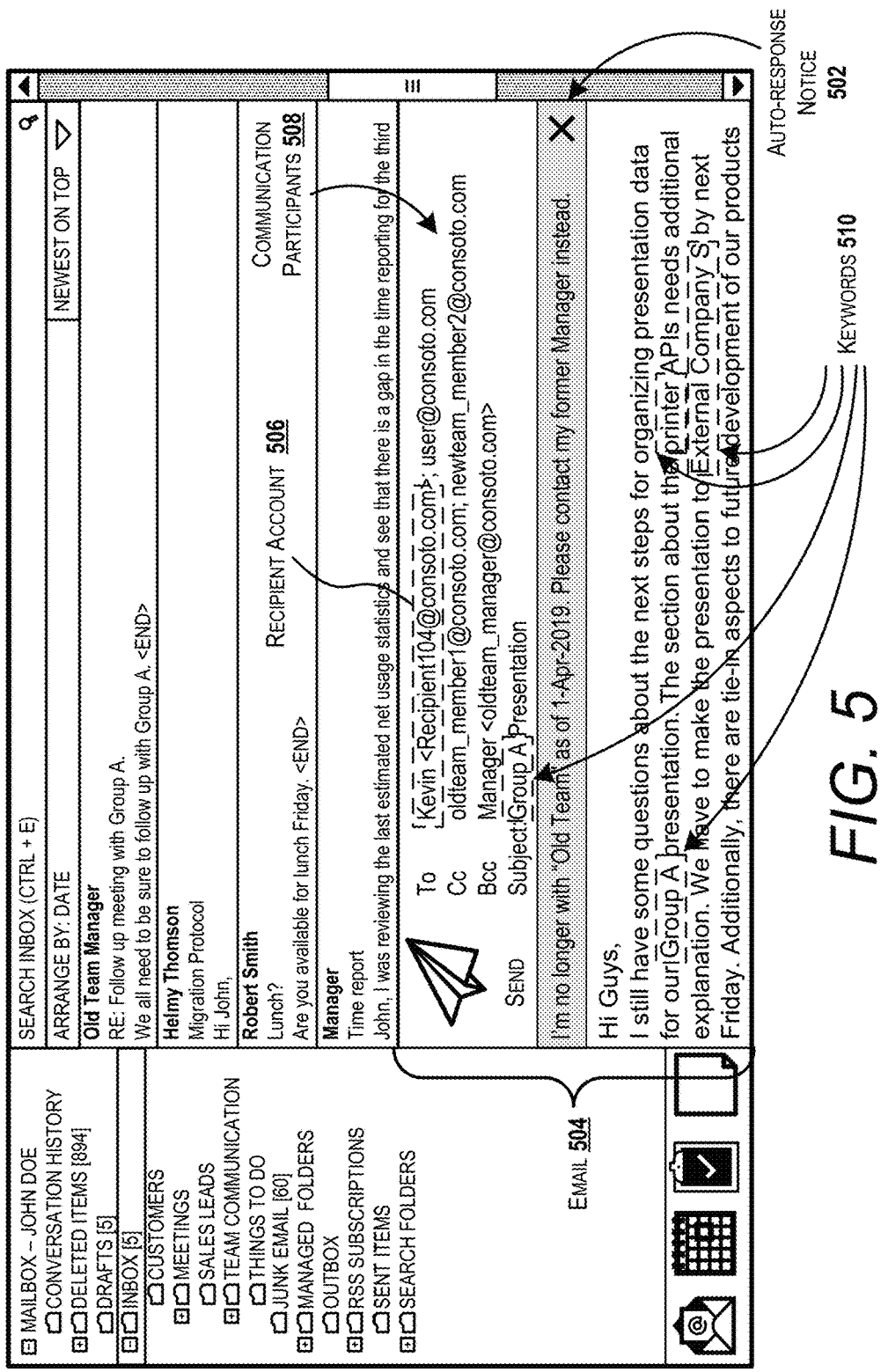
FIG. 5 illustrates an example sender email interface showing an auto-response notice.

FIG. 5 illustrates an example email sender interface 500 that presents an auto-response notice 502. In this example interface 500, the sender (or drafter of the email prior to sending) shows an email 504 that includes an indicator of the recipient account 506 and multiple other communication participants 508 indicated in the "To," "Cc," and "Bcc" lines of the email drafting interface.

The email 504 also includes a subject line and body text. The content of the email 504 may be analyzed by a component of the communications tool 108 on the sender computing device 106 and/or the resolving system 100 both shown in FIG. 1A. Part of the analysis may include identifying keywords 510 in the email 504. The keywords may be words or phrases related to one or more groups. In this example, the name of a group, "Group A" is a keyword that is found in both the subject and the body of the email 504.

The presence of the keywords 510 may be used by the system to determine that the email 504 contains content that is related to or pertains to Group A. Group A may be associated with the old team 134B as shown in FIGS. 1 and 2. Information about group associations may also be obtained from the directory of groups 138 shown in FIGS. 1D-F.

The keywords 510 may also provide an indication that the subject matter of the email 504 relates to subject matter that the recipient worked on with his old team. In this example, the recipient's old team did work related to printers and the word "printer" appears in the body of the email 504. Additionally, there may be an association between "External Company S" and the old team. Thus, keywords may indicate a connection between this email 504 and the subject matter of the old team.

Given the keywords indicating that this email 504 pertains to Group A which is associated with the recipient's old team but not his or her new team, and the keywords that indicate subject matter associated with the old team, the resolving system 100 may cause the auto-response notice generator 122 to generate an auto-response notice 502.

In this example, the auto-response notice 502 is included in the same UI that is used to draft the email 504. The auto-response notice 502 may appear as soon as the system is able to determine that with regard to the recipient account 506, the email 504 includes subject matter that pertains to the recipient's old team.

The content of the auto-response notice 502 may be customized by the recipient. In this example, the recipient Kevin may include information such as the date he was no longer associated with the old team as well as indicating a person currently associated with that team to contact instead. A customized message may be provided by the resolving system 100 to the sender computing device 106. The content of the auto-response notice 502 may also vary based on the sender being part of the same organization or message domain (e.g., having email addresses that use the same email server). For example, a custom auto-response notice 502 to an internal sender may be more specific and provide greater details than an auto-response notice 502 that is presented to an external sender using the messaging account that is on a different domain than the recipient account 506.

Moreover, the auto-response notice 502 may also be based on the team and/or group to which the content of the email 504 pertains. In this example, the email 504 pertains to the old team of the recipient, so the auto-response notice 502 may indicate that the recipient is no longer with the "old team" and may provide contact information for a manager who is still a part of that team. If however, the email 504 was directed to Group B but not necessarily related to the old team, the auto-response notice 502 could provide information indicating that the recipient is no longer associated with Group B and identify a moderator or leader of Group B as an alternative contact.

Figure 6:
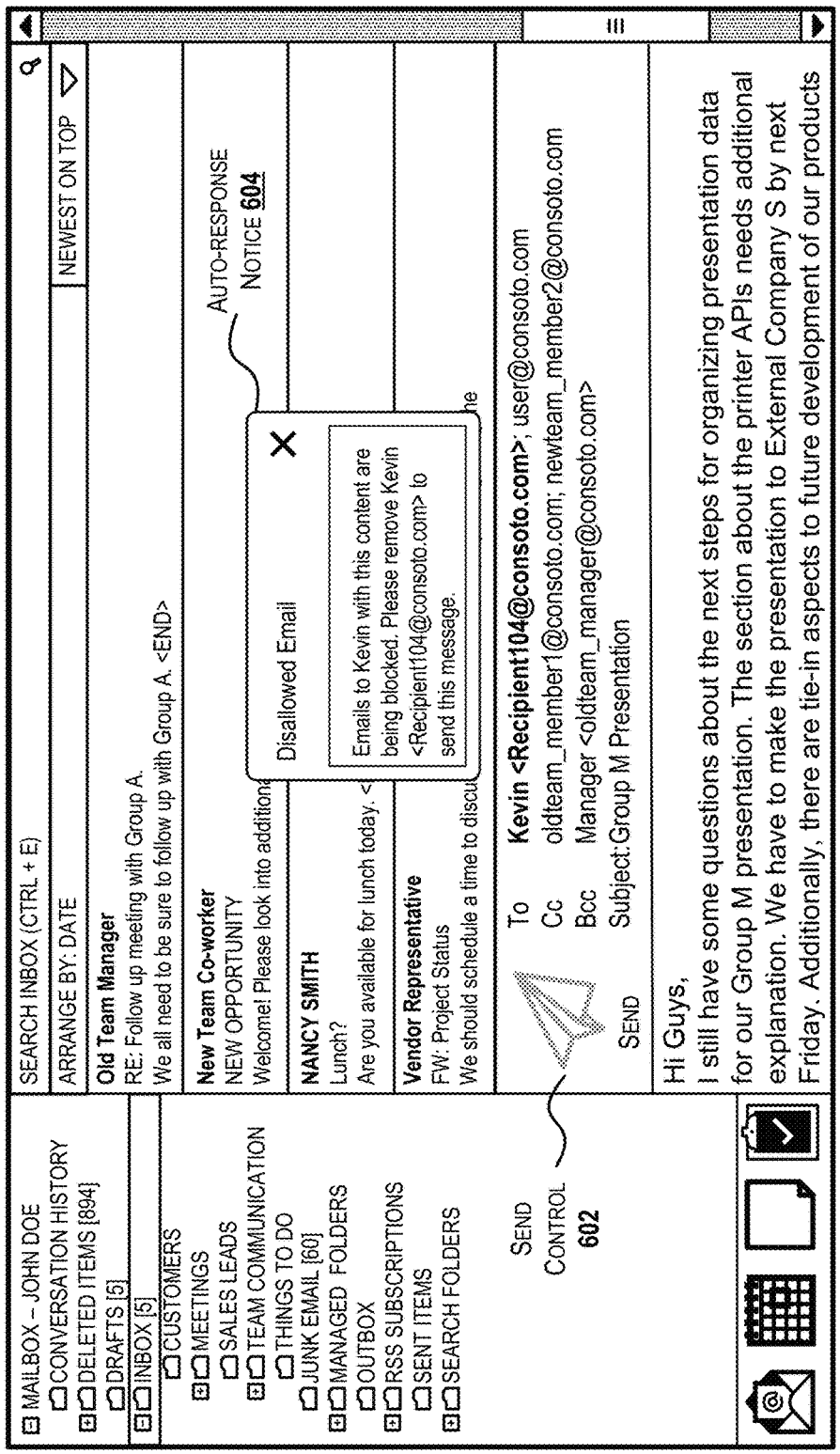
FIG. 6 illustrates an example sender email interface showing a message being blocked from sending.

FIG. 6 illustrates an example email sender interface 600 showing how sending of an email message may be blocked. In this example, interface 600 shows that the send control 602 for the UI to send an email message is deactivated. This may be based on the determination by the resolving system 100 to block the email. Blocking sending of the email may be implemented by a component of the communications tool 108 such as a plug-in used by the sender 102 as shown in FIG. 1A. Alternatively, blocking may be performed by the communications router 118 and may result in a delivery failure notification or other response that is sent back to the sender computing device 106 after the sender 102 attempts to transmit the email.

In this example interface 600, the auto-response notice 604 is shown as a pop-up window that explains why sending of the email is being blocked. The content of this auto-response notice 604 may indicate which recipient of the email is triggering the prohibition on sending. As with the other examples of auto-response notices, this auto-response notice 604 may be customized based on context and or by the recipient. For example, the send control 602 may become inactive once the system determines that the email is directed to a recipient account and relates to content for a team or group with which the recipient account is no longer associated. In this example, the auto-response notice 604 may appear if the sender attempts to activate the send control 602.

Figure 7:
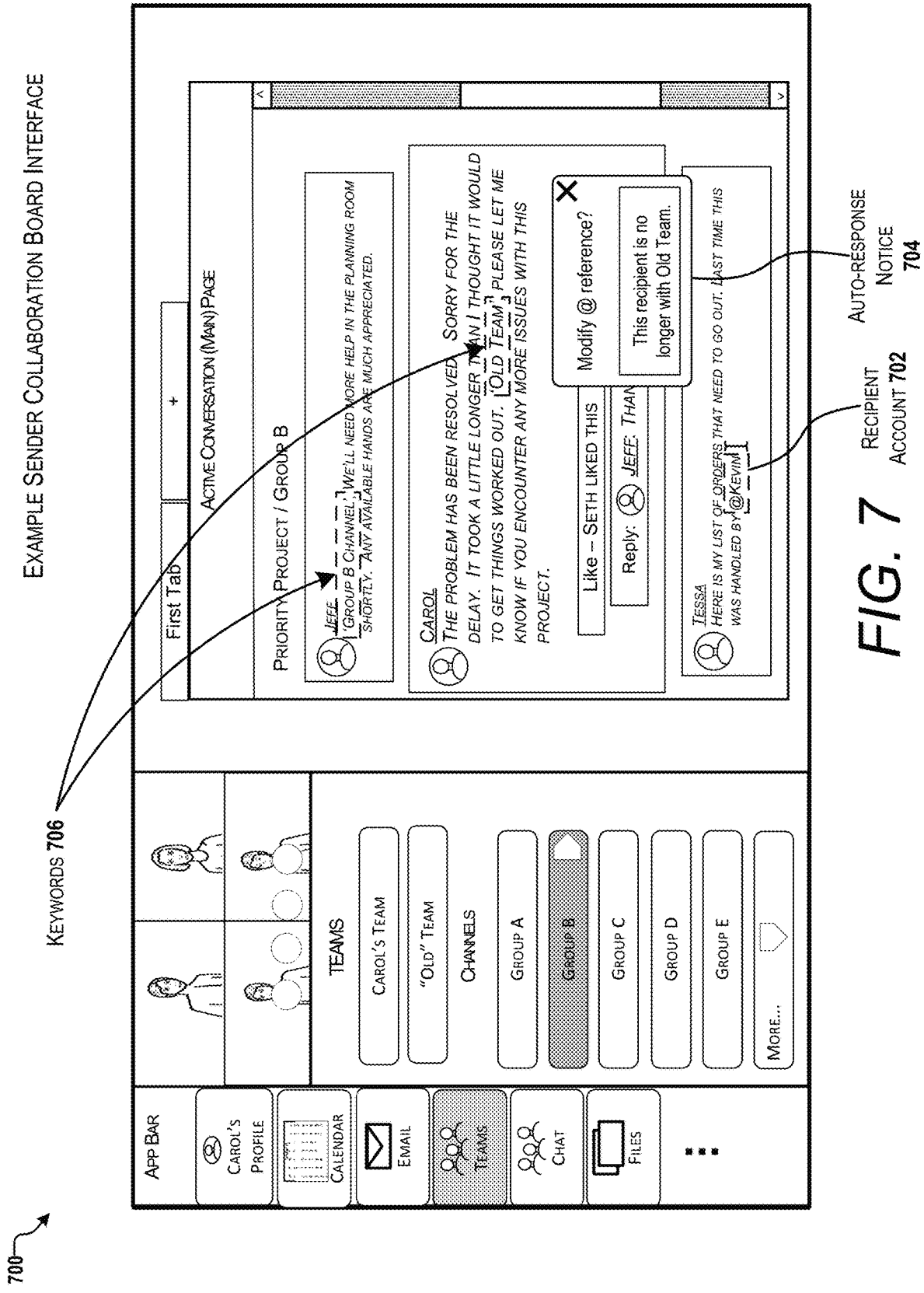
FIG. 7 illustrates an example sender collaboration board interface showing an auto-response notice.

FIG. 7 illustrates an example sender collaboration board interface 700. In this example interface 700, a channel of the collaboration board is populated with a number of posts related to Group B. In the collaboration board interface 700, the context of the messages is defined by placement within this conversation page. Thus, channel name or description (i.e., Priority Project/Group B) may be used to definitively identify that all messages with this channel relate to Group B.

The recipient account 702 may be indicated in the collaboration board interface 700 by use of an @ reference in which a user name follows the @ to tag or direct a post to that user. The use of an @ reference is one nonlimiting example of how a recipient account 702 may be indicated within a collaboration board interface 700.

Upon typing the @ reference, the auto-response notice 704 may appear in proximity (e.g., at least partially overlapping) to part of the message that includes the recipient account 702. This auto-response notice 704 may provide instructions or suggestions for modifying the message to omit the recipient account 702 or replace it with a different recipient account (e.g., please tag Carol instead of Kevin).

In an implementation, the auto-response notice 704 may be included in the channel as a comment or a banner that can be seen by all participants of the channel instead of or in addition to a temporary pop-up window. When the auto-response notice 704 is implemented in this way other participants in the channel may be reminded that Kevin is no longer a part of Group B, even if those other participants are not sending messages to Kevin. A banner indicating that Kevin is no longer a part of Group B may persist in the collaboration board interface 700 for a period of time after Kevin leaves Group B (e.g., one week, four weeks, two months, etc.).

Figure 8:
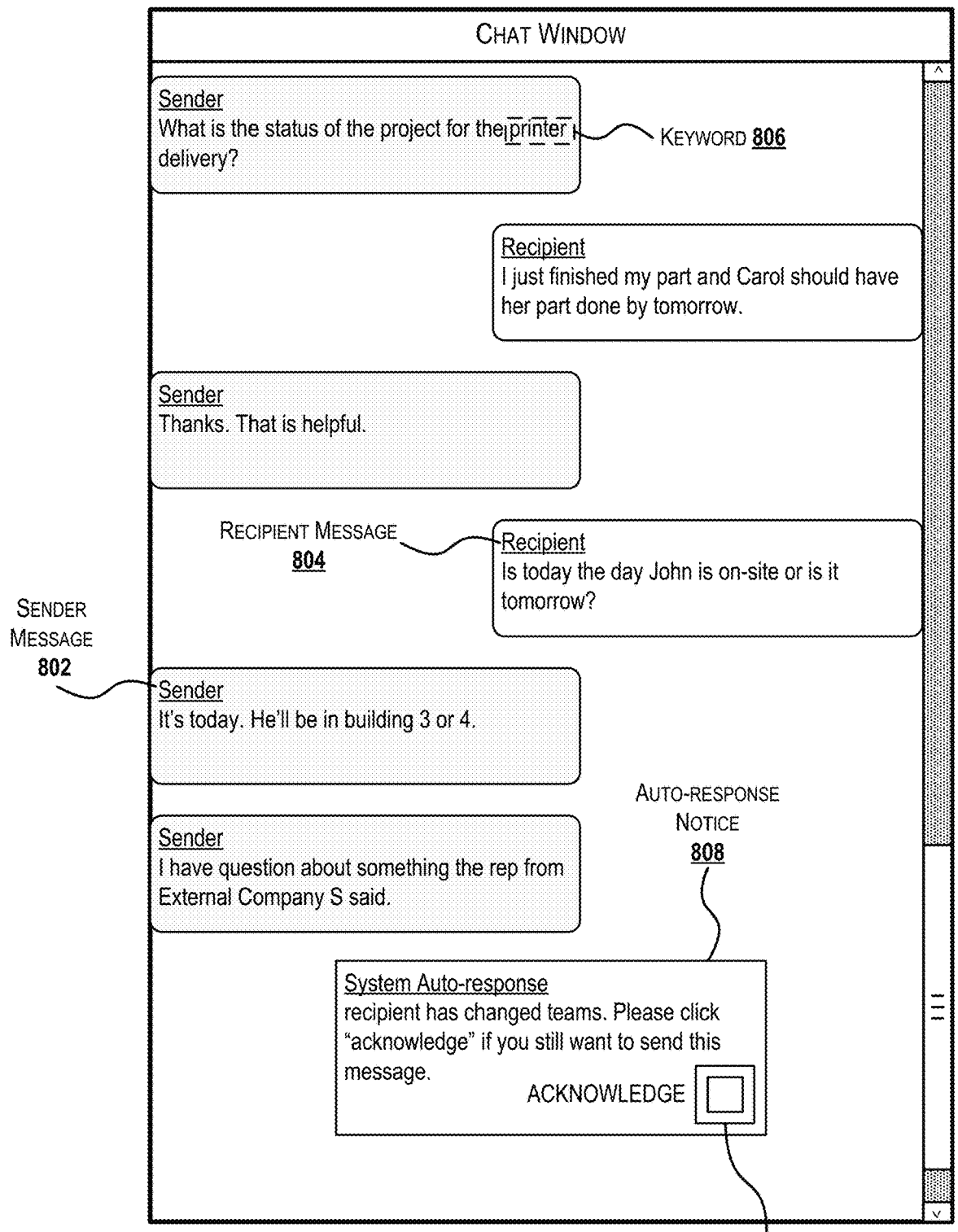
FIG. 8 illustrates an example chat interface showing an auto-response notice.

FIG. 8 illustrates an example chat window interface 800 in which a sender and a recipient exchange chat messages. In this example interface 800, both the sender and the recipient may see a similar UI. The messages may be placed into the chat window interface 800 over a lengthy period of time and the spacing between messages may not be indicative of elapsed time. Thus, for example, messages at the top of the chat window interface 800 may have been created weeks or months before the most recent message at the bottom of the chat window interface 800.

The chat window interface 800 includes multiple sender messages 802 and multiple recipient messages 804. All of the sender messages 802 may be inherently associated with a sender account or sender ID based on the communication account that was used to initiate the chat. Similarly, all of the recipient messages 804 may be inherently associated with the recipient account or recipient ID.

Identity of the sender may be used to determine any groups or teams with which the chat messages are associated. Additionally, if there are other recipients in the chat, such as with a group chat, identity of the other recipients may be used to characterize the chat as being associated with a particular group or team. Moreover, the message content of any or all of the chat messages in the chat window may be used to characterize the chat thread as being related to a team or group. In an implementation, a keyword 806 in the chat thread may be used. For example, if the recipient has left a team that did work with printers, the presence of the keyword 806 "printer" may indicate that this chat conversation is related to the recipient's old team.

The system may determine that the conversation in this chat window interface 800 is associated with the old team. The content of this chat was relevant to the recipient earlier in the chat history when he or she was still a member of the old team, but at the time the most recent message is created by the sender the recipient has left the old team.

Upon the sender typing "enter" or otherwise indicating a desire to send a message to the recipient, an auto-response notice 808 may be presented within the chat window interface 800. In one implementation, the auto-response notice 808 may be presented in a way that appears the same or similar to a message from a participant in the chat. The auto-response notice 808 may include default content or content generated by the recipient. The content of the auto-response notice 808 may inform the sender that the recipient has changed teams. The most recent message of the sender may still be delivered to the recipient, or, posting of the message to the chat may be prevented.

In an implementation, the auto-response notice 808 may include an element to indicate an auto-response acknowledgment 810. For example, by selecting a checkbox the sender may indicate that he or she has read and acknowledges the auto-response notice 808. The auto-response acknowledgment 810 may be implemented in any of the interfaces shown herein and with any of the various messaging methods described. The response of the sender to the auto-response acknowledgment 810 may allow the sender to proceed with sending the chat message to the recipient. Also, if the sender has previously acknowledged other auto-response notices 808 for the same recipient, the content of the auto-response notice 808 may change and present a modified auto-response notice. For example, the modified auto-response notice may include a more strongly worded instruction to the sender to stop messaging the recipient about the work of this team. Alternatively, after viewing and acknowledging a first auto-response notice 808, the system may allow the sender to continue to message the recipient without generating subsequent auto-response notices.

Reporting on interaction between the sender and the auto-response acknowledgment 810 may be provided to the recipient. Thus, the recipient may be shown which senders have received auto-response notices, which senders have ignored those messages, and which senders have acknowledged the auto-response notices. Additionally, the recipient may be shown the number of times that each sender has been presented with an auto-response notice. With this information, the recipient may choose to block that sender from generating further messages about the group or team with which the recipient is no longer associated. Additionally or alternatively, the recipient may choose to directly reach out to that sender.

Figure 9:
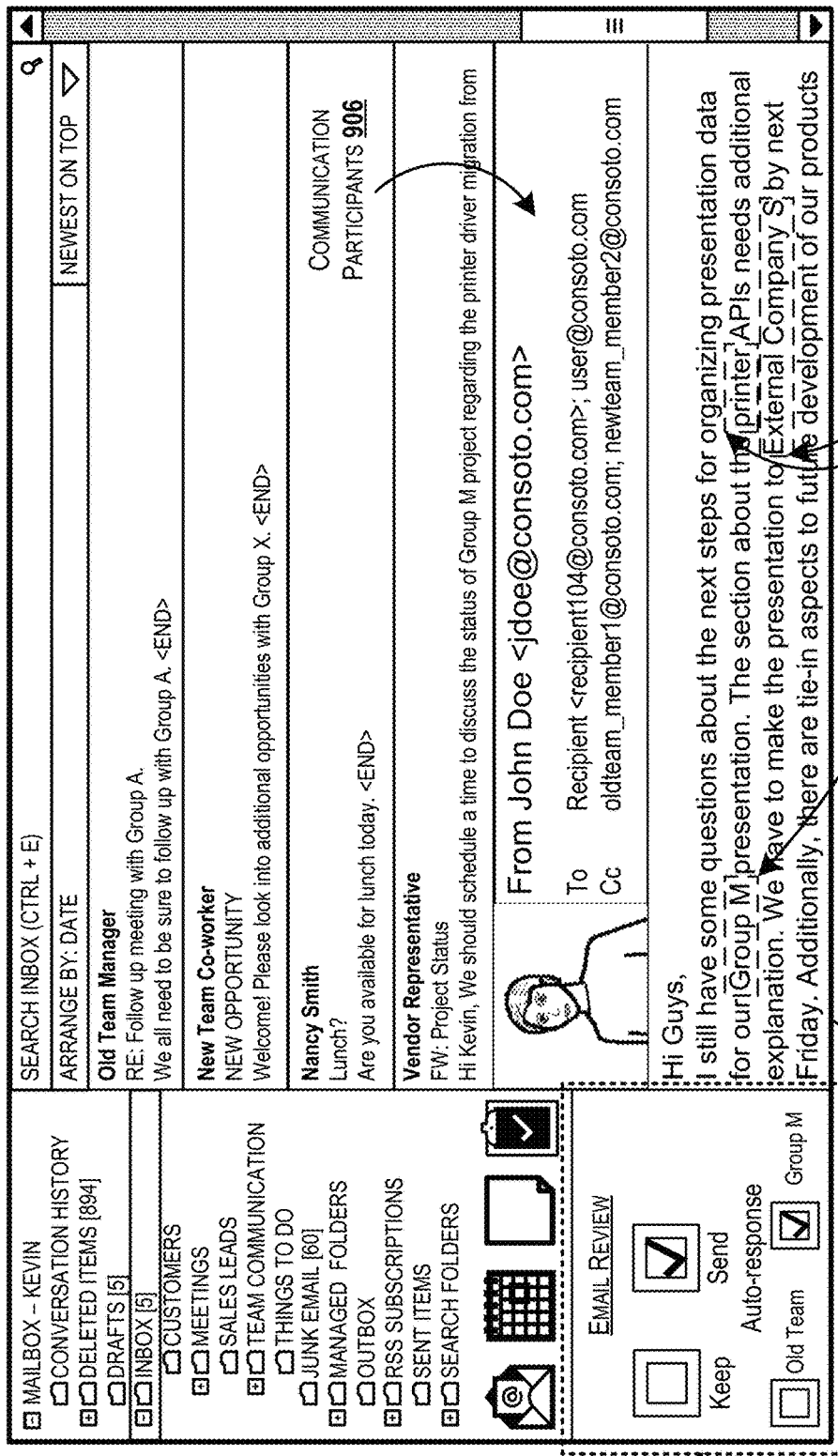
FIG. 9 illustrates an example recipient email interface showing how a recipient may provide feedback regarding a message.

FIG. 9 illustrates an example recipient email interface 900. In this example interface 900, the recipient is able to view an email 902 sent from the sender John Doe. The email 902 may include multiple keywords 904 that can be used to identify the message as being related to a team or group with which the recipient is no longer associated. The communication participants 906 which include the sender, John Doe, and the other email addresses listed in the "To" and "Cc" lines can provide further data for classifying the email 902 as belonging to a former group or team.

The recipient email interface 900 shows an email 902 that has been received by the recipient. Thus, this email 902 was not blocked from being sent. Prior to or subsequent to sending the email 902, the sender may or may not have been presented with an auto-response notice.

The recipient email interface 900 may include a portion for recipient feedback 908. The portion of the UI for recipient feedback 908 may allow the recipient to indicate whether this is an email he or she wishes to receive or if it is one for which an auto-response should be generated. Additionally, the recipient feedback 908 may further specify which groups and/or teams the email letter to is associated with. This explicit identification and labeling by the recipient may be provided to the resolving system 100, such as to the machine learning system 124, to improve the classification of future messages. Although this example is presented in the context of email, recipient feedback 908 may be provided in an interface for any type of communications tool.

In an implementation, if the recipient indicates that this email 902 is the message for which an auto-response notice should be sent, an auto-response notice may be sent out to all of the communication participants 906, not only to the sender. This may be useful for preventing other communication participants 906 from using "reply all" or otherwise directing further messages about the work of this group to the recipient.

Figure 10:
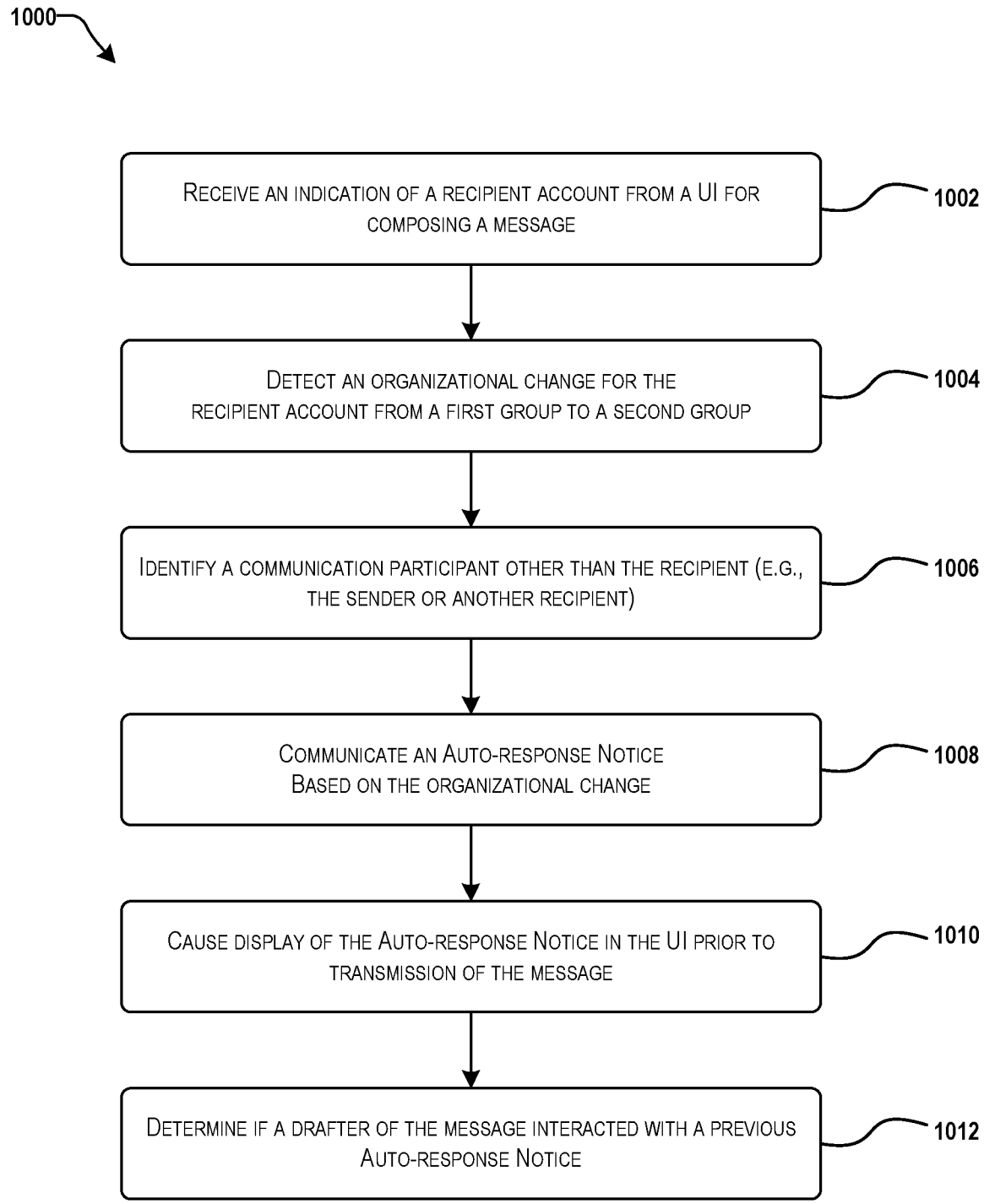
FIG. 10 is a flow diagram illustrating aspects of a routine for communicating an auto-response notice based on organizational change.
Figure 11:
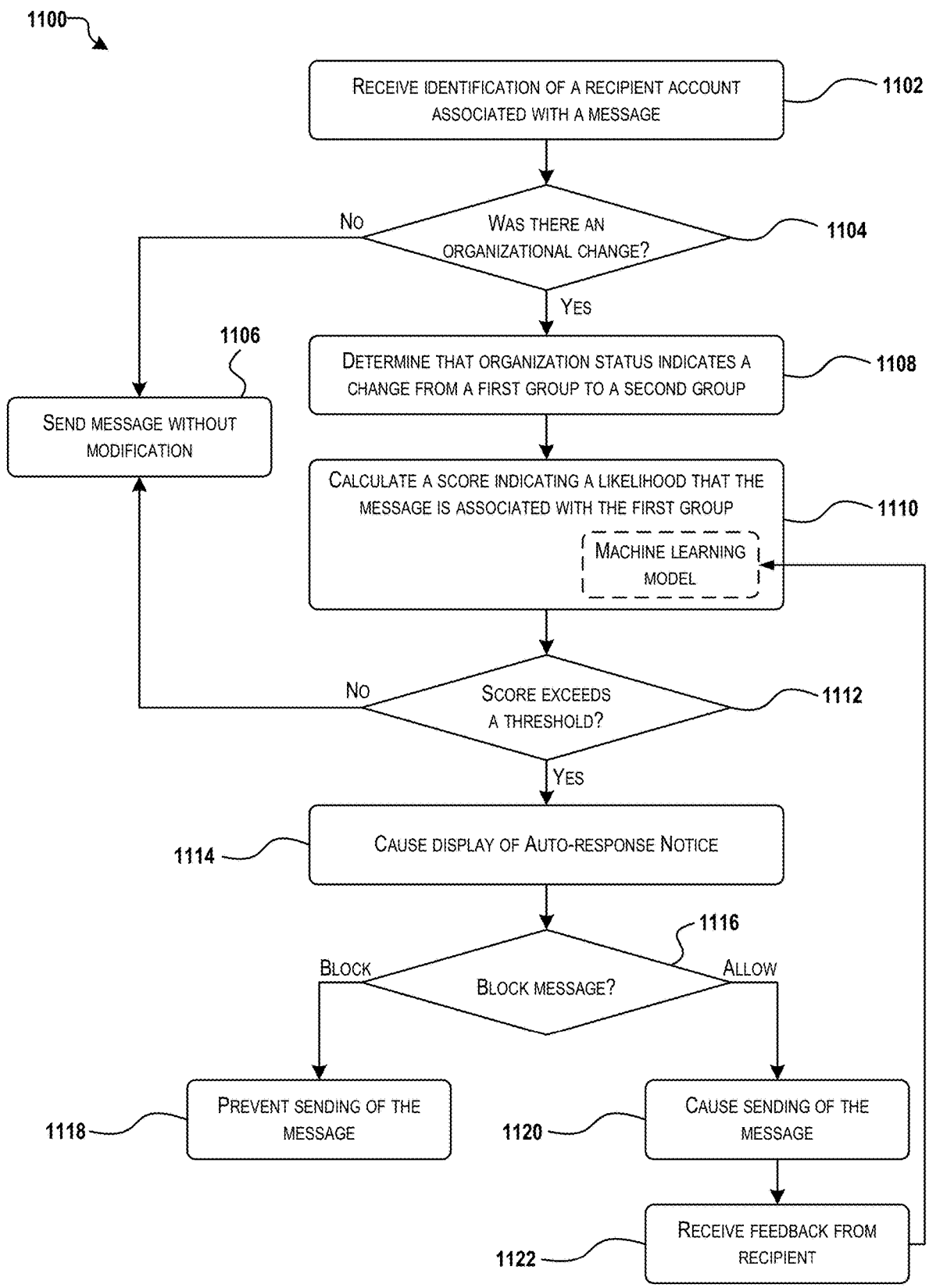
FIG. 11 is a flow diagram illustrating aspects of a routine for displaying an auto-response notice based on a score assigned to a message.

FIGS. 10 and 11 are diagrams illustrating aspects of routines 1000 and 1100 related to auto-response notices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 10 and 11 can be implemented in association with the example presentation UIs described above. For instance, the various device(s) and/or module(s) described herein can generate, transmit, receive, and/or display data associated with the content of a message and/or auto-response notice.

At operation 1002 an indication of a recipient account is received from a UI for composing messages. The UI may be, for example, UI 110 shown in FIG. 1A. The indication of the recipient account may take any suitable form such as an email address, a chat service handle, a user name, a phone number, etc. The indication of the recipient account may be the recipient ID 114 shown in FIG. 1A.

Next, at operation 1004, an organizational change from a first group to a second group associated with the recipient account is detected. The change may include the user associated with the recipient account changing teams within an organization, leaving a group, or another type of change related to a group of people or users who exchange messages. In an example, the communication account does not change (i.e., the user maintains the same email address) but the role or job of the user in the organizational changes.

The organizational change may be detected, for instance, by receiving an organizational change 136 notification from an organizational directory 132 as shown in FIG. 1C. In an implementation, an indication of the organizational change may be received from a Global Address List (GAL) in response to a request from the resolving system 100. The organizational change may indicate that a user has moved from a first group to a second group within an organization. Additionally, even without identifying any groups or teams, the organizational change may indicate there was a change by indicating a change in reporting structure such as the user having a different supervisor or different entity to which he or she reports. Moreover, change in group membership such as disenrolling or unsubscribing from a group may be a detected organizational change.

Next, at operation 1006, a communication participant other than the recipient may be identified in a message to the recipient communication account. The operations performed in routine 1000 may be implemented during composition of the message and before sending. Thus, the person writing the message may be referred to as a "drafter" to indicate that the message does not necessarily need to be sent before performance of the operations in routine 1000.

Next, at operation 1008, an auto-response notice is communicated based on detecting an organizational change. In an implementation, a decision to communicate the auto-response notice may also be based on an identity of a communication participant. The communication participant may be the drafter of the message or another recipient of the message (e.g., a recipient of an email whose email address is included in a "Cc" line or "Bcc" line of an email). Identifying the drafter of the message and/or other recipients may leverage knowledge of those users' membership in groups and teams to determine if the message is associated with the first group, the second group, or another group.

The auto-response notice is a message or notification to the drafter of the message that the recipient account is no longer associated with the group to which the message appears to pertain. The auto-response notice 130 shown in FIG. 1B is one example of an auto-response notice. In an implementation, the auto-response notice is an alert displayed to the drafter of the message during composition of the message. The auto-response notice may be displayed as an alert in a visually prominent way such as in a window or pop-up that at least partially overlaps the field in a composition window for entering the recipient address. In a different implementation, the auto-response notice is a separate message sent to the drafter, or sender, after sending of the message.

The sending of the auto-response notice may be triggered by the detection of the organizational change at operation 1004. Stated differently, detecting an organizational change for the recipient account may be a threshold condition that must be met before generating an auto-response notice. The organizational change may indicate which team(s) and/or group(s) the recipient account was in formerly but is now no longer associated with. Determining that the message pertains to any of the former teams or groups may be the basis for communicating the auto-response notice.

The identities of the communication participant(s) (i.e., the drafter of the message and/or other potential recipients of the message) can be used to determine if the message is associated with a particular group or team. If so, and if this group or team is one of the former groups or teams of the user who is associated with the recipient account, then inclusion of those communication participant(s) may cause the system to generate and display the auto-response notice.

For example, if the communication participant is the drafter of the message, then communicating the auto-response notice may be based on identifying an association of the drafter of the message with the first group with which the recipient account is no longer associated. As a further example, if the communication participant is one of the other recipients of the message, then communicating the auto-response notice may be performed based on identifying an association of the other recipient with the first group. In both these examples, if one or more of the communication participants is known to belong to a former group of the recipient account, then this association between one or more of communication participants and the former group may cause the system to generate the auto-response notice for display to the drafter of the message.

In an implementation, communicating the auto-response notice may be based on calculating a score for the message. One example of calculating a score for a message is shown in FIG. 4. Thus, this score for the message may be the same as the score 404 from FIG. 4. The score may be calculated based on a plurality of factors which can include the identities of the communication participants. Thus, the identities of the drafter and/or any other recipients of the message may represent one of multiple factors used to assign a score to the message. Other factors may include, for example, the content of the message. The score may be compared to a threshold value and determining that the score exceeds the threshold value may cause the system to communicate the auto-response notice. It will be understood that there are multiple techniques for assigning a score to a message based on characteristics of the message and there are many techniques for identifying a threshold value.

The score may be calculated at least in part by a machine learning model such as a model implemented by the machine learning system 124 shown in FIG. 1A. The machine learning model may be implemented as a neural network, a support vector machine, a naïve Bayes classifier, or other machine learning technique. The machine learning model may be created through supervised learning by training the model on feedback provided from the recipient account regarding previous messages directed to the recipient account. This training provides a label data set of messages with labels of, for example, "former group" or "not former group." The feedback from the recipient account can indicate which past messages were associated with a former group such as the first group in this example. FIG. 9 shows one example interface 900 in which the recipient account may provide feedback regarding a message using a recipient feedback 908 portion of the UI.

Next at operation 1010, display of the auto-response notice is caused to occur in the UI prior to transmission of the message. For example, the auto-response notice generator 122 of the resolving system 100 may cause the auto-response notice 130 to be displayed in the UI 110 while the message is still being drafted. For example, the auto-response notice 130 may be displayed as a pop-up window in proximity to a location in the UI 110 in which the sender 102 has entered the recipient ID 114 such as an email address of the recipient 104. FIGS. 5, 7, and 8 provide other examples of user interfaces that display an auto-response notice. In an implementation, the auto-response notice 130 may be displayed at least partially overlapping a portion of the UI that displays the recipient account (e.g., the "To:" field in an email composition window).

Next at operation 1012, it may be determined if a drafter of the message has interacted with a previous auto-response notice. The drafter of the message may interact with an auto-response notice by dismissing the auto-response notice by clicking a close button or similar UI element. The drafter of the message may also acknowledge the auto-response notice by actively responding to it such as by making an affirmative acknowledgment as shown in FIG. 8. Alternatively, the drafter of the message may appear to ignore the auto-response notice by not interacting with that auto-response notice. The extent and type of interaction of the drafter with this and other auto-response notices may be used to determine if the drafter continues to receive auto-response notices, if the content of the auto-response notices is modified, such as to emphasize the fact that the recipient account is no longer associated with a group, or even to block the drafter from sending additional message to the recipient account.

FIG. 11 shows a routine 1100 for determining if a system should cause the display of an auto-response notice.

At operation 1102, identification of a recipient account is received. This may be received during composition of the message such as when the drafter of the message enters the email address of the recipient. In an implementation, the identification of the recipient account may be received by processing at the communications router 118 after the message is sent which may, in turn, inform the auto-response notice generator 122 of the identity of the recipient(s) for the message.

Next at decision 1104, an organizational directory is queried for an organizational status to determine if there was an organizational change for the recipient account. The recipient account may be provided to the organizational directory and the organizational directory may respond by indicating whether that account is associated with a change occurring within a set timeframe. For example, the organizational directory may report all changes that have occurred within the last six months (or any other predetermined length of time).

If, at decision 1104, it is determined that there was no organizational change for the recipient account, then there is no need for an auto-response notice and the routine 1100 proceeds along the "no" path to operation 1106. At operation 1106, the message is sent without modification (i.e., there is no auto-response notice generated in conjunction with the message).

If, however, at decision 1104, it is determined that there was an organizational change, then the routine 1100 proceeds along the "yes" path to operation 1108. At operation 1108, it is determined that the organizational status of the recipient account indicates a change in association with the first group to an association with the second group. This determination may be based on an organizational change 136 reported by the organizational directory 132. This change from a first group to a second group also includes the change from the old team 134B to the new team 134A as shown in FIGS. 1C-F.

Next, at operation 1110, a score is calculated for the message indicating a likelihood that the message is associated with the first group. The score may be the same as the score 404 shown in FIG. 4. In an implementation, the score may be based on an identity of the drafter of the message, and an identity of one or other recipients of the message, the content of the message, or any other characteristic of the message. For example, the content of the message may be analyzed for keywords and the score may be based on the presence of one or keywords in the message that are associated with the first group. For example, if a name of the first group is Printer Group then the keyword "printer" in the content of the message may result in a score that indicates the message is likely associated with the first group. The score may be calculated by a machine learning model such as the classifier 126 implemented by the machine learning system 124.

At decision 1112, it is determined if the score exceeds a threshold value. The threshold may be a value that is determined based on experience, machine learning, user preference, or another factor. A score above the threshold indicates that the message is likely to be associated with the first group (i.e., a former group) and a score below the threshold indicates that the message is not likely to be associated with the first group. The score may be calculated in the same or similar manner as the score 404 shown in FIG. 4. Although this example describes exceeding the threshold (i.e., having a value higher than the threshold) as indicating that the message is likely associated with the first group it is to be understood that there is no inherent directionality or value in the score, so that an alternative implementation of a score below the threshold may be the indicator of association with the first group.

If, at decision 1112, the score is determined to be below the threshold, then routine 1100 proceeds along the "no" path to operation 1106 where the message is sent "normally" without modification or generation of an auto-response notice. If, however at decision 1112, the score is determined to be above the threshold, then routine 1100 proceeds along the "yes" path to operation 1114.

At operation 1114, display of the auto-response notice is caused by the system. The auto-response notice may indicate the organization status of the recipient account. For example, the auto-response notice may indicate that the recipient is no longer with the first group. The auto-response notice may also, for example, indicate that the recipient has moved to group two. The system, for example the resolving system 100, may cause the sender computing device 106 to display the auto-response notice 130 by sending instructions or commands to the sender computing device 106. Display of the auto-response notice may be caused prior to transmission of the message such as when a drafter of the message is still writing the message.

The contents of the auto-response notice may be based on the identity of the group (e.g., the first group) to which the message is likely associated. For example, the auto-response notice may include the name of the first group and state that the recipient is no longer a member of this group. Additionally or alternatively, the auto-response notice may provide a name or contact information for another current member of that group. Furthermore, the auto-response notice may provide an explanation or context indicating that the organization status of the user associated with the recipient account has changed. For example, the auto-response notice may indicate that: "Kevin has left the first group and is now a member of the second group."

At decision 1116, it is determined if sending of the message should be blocked. For example, the system may block the message if the score exceeds a second threshold value. The second threshold value may be used to determine if sending of the message is permitted. For example, the second threshold may be the same as the blocking threshold shown in FIG. 4. The auto-response notice may be modified in response to determining that the score exceeds the second threshold value.

In some implementations, the sending of a message may be blocked if it is determined that the score exceeds the second threshold value. Thus, the modified auto-response notice may inform the drafter of the message that sending the message is blocked because the message is determined to be associated with the group with which the recipient is no longer associated. Additionally, messages may be blocked if the same sender repeatedly sends messages that are related to the first group. Thus, the behavior of the drafter of the message and/or a score associated with the message may be used to determine whether sending should be blocked.

If, at decision 1116, it is determined that sending of the message is not permitted, the routine 1100 proceeds along the "block" path to operation 1118. At operation 1118, sending of the message is prevented. FIG. 6 shows an example interface 600 in which the sending of the message is prevented.

If, however, at decision 1116, it is determined that sending of the message is permitted, the routine 1100 proceeds along the "allow" path to operation 1120. At operation 1120, the message is sent or sending of the message is caused to occur. The message may be sent, for example, by the communications tool 108 of the sender computing device 106 and/or by the communications router 118.

Next at operation 1122, feedback is received from the recipient of the message. The feedback may indicate whether the recipient believes this message is one he or she should receive or if it is a message that is in fact related to the first group or some other group or team with which the recipient is no longer associated. FIG. 9 shows one example interface 900 for providing feedback.

The feedback from the recipient may be provided to the machine learning model and used by the machine learning model as training data to improve the accuracy of the model for classifying future messages. With this feedback, and other feedback, the machine learning model may adjust or set the score and the threshold value used for determining whether a message is related to the first group.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external central processing units (CPUs) or graphics processing units (GPUs), and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached FIGS. should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 12:
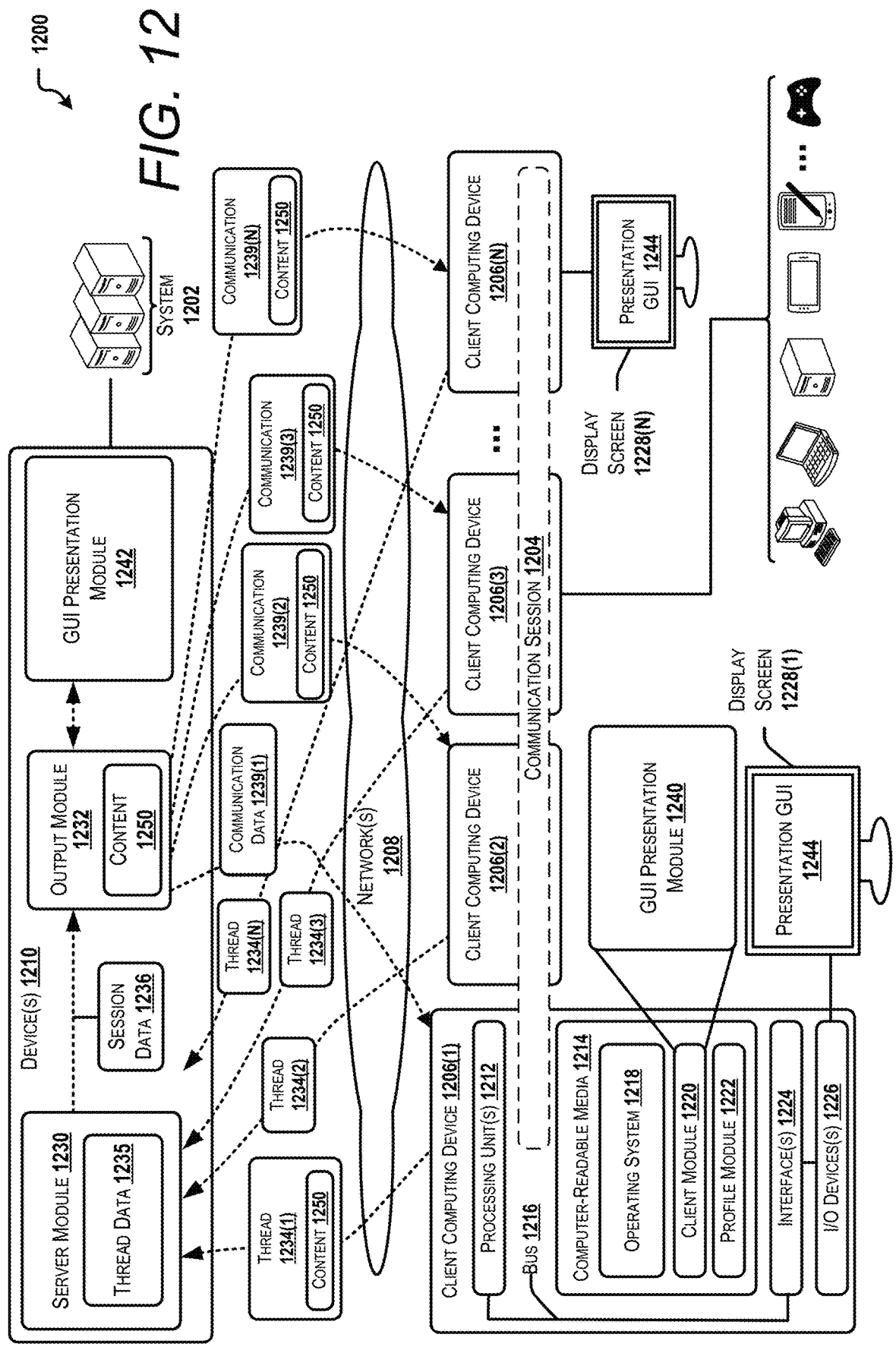
FIG. 12 is a computing system diagram showing aspects of an illustrative operating environment for the technologies disclosed herein.

FIG. 12 is a diagram illustrating an example environment 1200 in which a system 1202 can implement the techniques disclosed herein. In some implementations, a system 1202

(also referred to as a data processing system) may function to collect, analyze, and share data or characteristics regarding one or more messages that are sent between users during a communication session 1204.

As illustrated, the communication session 1204 may be implemented between a number of client computing devices 1206(1) through 1206(N) (where N is a number having a value of two or greater) that are associated with or are part of the system 1202. The client computing devices 1206(1) through 1206(N) enable users, also referred to as individuals, to participate in the communication session 1204.

In this example, the communication session 1204 is hosted, over one or more network(s) 1208, by the system 1202. That is, the system 1202 can provide a service that enables users of the client computing devices 1206(1) through 1206(N) to participate in the communication session 1204 (e.g., by exchanging email messages and/or participating in a shared collaboration channel). Consequently, a "participant" to the communication session 1204 can comprise a user and/or a client computing device (e.g., multiple users may be in a room participating in a communication session via the use of a single client computing device), each of which can communicate with other participants. As an alternative, the communication session 1204 can be hosted by one of the client computing devices 1206(1) through 1206(N) utilizing peer-to-peer technologies. The system 1202 can also host chat conversations and other team collaboration functionality (e.g., as part of an application suite).

In some implementations, such as chat conversations and other team collaboration functionality are considered external communication sessions distinct from the communication session 1204. A computing system 1202 that collects participant data in the communication session 1204 may be able to link to such external communication sessions. Therefore, the system may receive information, such as date, time, session particulars, and the like, that enables connectivity to such external communication sessions. In one example, a chat conversation can be conducted in accordance with the communication session 1204. Additionally, the system 1202 may host the communication session 1204, which includes at least a plurality of participants co-located at a meeting location, such as a meeting room or auditorium, or located in disparate locations.

In examples described herein, client computing devices 1206(1) through 1206(N) participating in the communication session 1204 are configured to receive and render for display, on a user interface of a display screen, communication data. The communication data can comprise a collection of various email messages, text messages, postings to collaboration applications, or other types of message content. The collection of various instances of communication data related to an ongoing communication between multiple participants may be referred to as a thread. For example, a series of email messages between the same participants or group of participants that share the same or similar subject line is an example of a thread. In some implementations, the threads may comprise text messages, posts to a website or collaboration application, and/or combination of messages data across different modalities.

A participant or user can view the content of the communication session 1204 using a computing device. In examples described herein, the client computing devices 1206(1) through 1206(N) participating in the communication session 1204 are configured to receive and render for display, on a user interface of a display screen, communication data. Another example of an individual thread of content can comprise text data that is the content of the message displayed on a display screen and/or audio data that renders the text data as speech using text-to-speech technology or audio data that captures the speech of a user. Accordingly, the various threads of content within the message data enable ongoing communication to be facilitated amongst a group of people dispersed across remote locations.

The system 1202 of FIG. 12 includes device(s) 1210. The device(s) 1210 and/or other components of the system 1202 can include distributed computing resources that communicate with one another and/or with the client computing devices 1206(1) through 1206(N) via the one or more network(s) 1208. In some examples, the system 1202 may be an independent system that is tasked with managing aspects of one or more communication sessions such as communication session 1204. As an example, the system 1202 may be managed by entities such as SLACK, WEBEX, GOTOMEETING, GOOGLE HANGOUTS, etc.

Network(s) 1208 may include, for example, public networks such as the Internet, private networks such as an institutional and/or personal intranet, or some combination of private and public networks. Network(s) 1208 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G, and so forth) or any combination thereof. Network(s) 1208 may utilize communications protocols, including packet-based and/or datagram-based protocols such as Internet protocol ("IP"), transmission control protocol ("TCP"), user datagram protocol ("UDP"), or other types of protocols. Moreover, network(s) 1208 may also include a number of devices that facilitate network communications and/or form a hardware basis for the networks, such as switches, routers, gateways, access points, firewalls, base stations, repeaters, backbone devices, and the like.

In some examples, network(s) 1208 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.12 standards (e.g., 802.12g, 802.12n, 802.12ac and so forth), and other standards.

In various examples, device(s) 1210 may include one or more computing devices that operate in a cluster or other grouped configuration to share resources, balance load, increase performance, provide fail-over support or redundancy, or for other purposes. For instance, device(s) 1210 may belong to a variety of classes of devices such as traditional server-type devices, desktop computer-type devices, and/or mobile-type devices. Thus, although illustrated as a single type of device or a server-type device, device(s) 1210 may include a diverse variety of device types and are not limited to a particular type of device. Device(s) 1210 may represent, but are not limited to, server computers, desktop computers, web-server computers, personal computers, mobile computers, laptop computers, tablet computers, or any other sort of computing device.

A client computing device (e.g., one of client computing device(s) 1206(1) through 1206(N)) may belong to a variety of classes of devices, which may be the same as, or different from, device(s) 1210, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1206(1) through 1206(N) of the various classes and device types can represent any type of computing device having one or more data processing unit(s) 1212 operably connected to computer-readable media 1214 such as via a bus 1216, which in some instances can include one or more of a system bus, a data bus, an address bus, a PCI bus, a Mini-PCI bus, and any variety of local, peripheral, and/or independent buses.

Executable instructions stored on computer-readable media 1214 may include, for example, an operating system 1218, a client module 1220, a profile module 1222, and other modules, programs, or applications that are loadable and executable by data processing units(s) 1212.

Client computing device(s) 1206(1) through 1206(N) may also include one or more interface(s) 1224 to enable communications between client computing device(s) 1206(1) through 1206(N) and other networked devices, such as device(s) 1210, over network(s) 1208. Such network interface(s) 1224 may include one or more network interface controllers (NICs) or other types of transceiver devices to send and receive communications and/or data over a network. Moreover, client computing device(s) 1206(1) through 1206(N) can include input/output ("I/O") interfaces (devices) 1226 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 12 illustrates that client computing device 1206(1) is in some way connected to a display device (e.g., a display screen 1228(N)), which can display a UI according to the techniques described herein.

In the example environment 1200 of FIG. 12, client computing devices 1206(1) through 1206(N) may use their respective client modules 1220 to connect with one another and/or other external device(s) in order to participate in the communication session 1204, or in order to contribute actively to a thread or collaboration environment. For instance, a first user may utilize a client computing device 1206(1) to communicate with a second user of another client computing device 1206(2). When executing client modules 1220, the users may share data, which may cause the client computing device 1206(1) to connect to the system 1202 and/or the other client computing devices 1206(2) through 1206(N) over the network(s) 1208.

The client computing device(s) 1206(1) through 1206(N) may use their respective profile modules 1222 to generate participant profiles (not shown in FIG. 12) and provide the participant profiles to other client computing devices and/or to the device(s) 1210 of the system 1202. A participant profile may include one or more of an identity of a user or a group of users (e.g., a user name, an email address, a unique identifier ("ID"), a recipient ID, etc.), user data such as personal data, machine data such as location (e.g., an IP address, a room in a building, etc.) and technical capabilities, etc. Participant profiles may be utilized to register participants for communication sessions.

As shown in FIG. 12, the device(s) 1210 of the system 1202 include a server module 1230 and an output module 1232. In this example, the server module 1230 is configured to receive, from individual client computing devices such as client computing devices 1206(1) through 1206(N), message threads 1234(1) through 1234(N). As described above, message threads can comprise a sequence of related messages such as emails, text data (e.g., text messages), contributions to a collaboration environment, and so forth. Thus, the server module 1230 is configured to receive a collection of various message threads 1234(1) through 1234(N) during the communication session 1204 (the collection is referred to herein as "thread data 1235"). In some scenarios, not all of the client computing devices that participate in the communication session 1204 provide thread data. For example, a client computing device may only be a consuming, or a "receiving," device such that it only receives content associated with the communication session 1204 but does not provide any content to the communication session 1204.

In various examples, the server module 1230 can select aspects of the message threads 1234 that are to be shared with individual ones of the participating client computing devices 1206(1) through 1206(N). Consequently, the server module 1230 may be configured to generate session data 1236 based on the message threads 1234 and/or past session data 1236 to the output module 1232. Then, the output module 1232 may communicate communication data 1239 to the client computing devices (e.g., client computing devices 1206(1) through 1206(3) participating in the communication session). The communication data 1239 may include text, images, video, audio, and/or other content data, provided by the output module 1232 based on content 1250 associated with the output module 1232 and based on received session data 1236.

As shown, the output module 1232 transmits communication data 1239(1) to client computing device 1206(1), and transmits communication data 1239(2) with content 1250 to client computing device 1206(2), and transmits communication data 1239(3) with content 1250 to client computing device 1206(3), etc. The communication data 1239 transmitted to the client computing devices can be the same or can be different (e.g., the same chat message sent to multiple participants or each participant receiving a different email message).

In various implementations, the device(s) 1210 and/or the client module 1220 can include a graphical user interface (GUI) presentation module 1240. The GUI presentation module 1240 may be configured to analyze communication data 1239 that is for delivery to one or more of the client computing devices 1206. Specifically, the GUI presentation module 1240, at the device(s) 1210 and/or the client computing device 1206, may analyze communication data 1239 to determine an appropriate manner for displaying email message, text message, chat, or posting to a collaboration workspace on the display screen 1228 of an associated client computing device 1206. In some implementations, the GUI presentation module 1240 may provide communication content to a presentation GUI 1244 rendered on the display screen 1228 of the associated client computing device 1206. The presentation GUI 1244 may be caused to be rendered on the display screen 1228 by the GUI presentation module 1240. The presentation GUI 1244 may include the email message, text message, chat, or posting to a collaboration workspace analyzed by the GUI presentation module 1240.

In some implementations, the presentation GUI 1244 may include a plurality of sections or grids that may render or comprise text, video, image, and/or content for display on the display screen 1228. For example, a first section of the presentation GUI 1244 may include a video feed of a presenter or individual, a second section of the presentation GUI 1244 may include a chat window for chats related to the content of the presentation. The GUI presentation module 1240 may populate the first and second sections of the presentation GUI 1244 in a manner that displays multiple different communication tools and respective communications.

In some implementations, the presentation GUI 1244 may be associated with a channel, such as a chat channel, enterprise teams channel, or the like. Therefore, the presentation GUI 1244 may be associated with an external communication session that is different than the general communication session.

Figure 13:
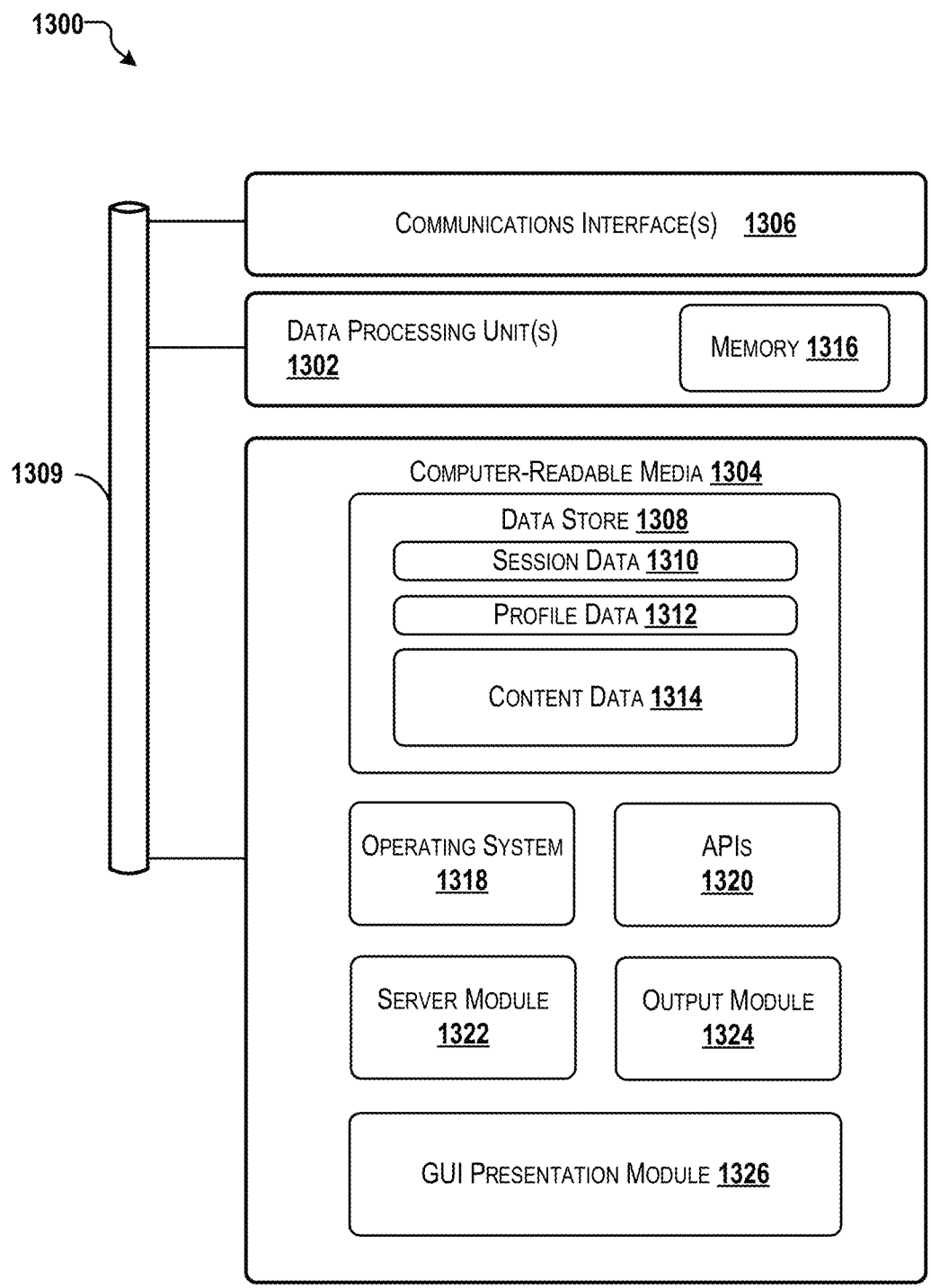
FIG. 13 is a computing architecture diagram showing aspects of the configuration and operation of a computing device that can implement aspects of the technologies disclosed herein.

FIG. 13 illustrates a diagram that shows example components of an example device 1300 (also referred to herein as a "computing device" or a "data processing system") configured to generate data for some of the user interfaces disclosed herein. The device 1300 may generate data that may include one or more sections that may render or comprise messages such as emails, text messages, chat messages, etc. for display on the display screen 1228 shown in FIG. 12. The device 1300 may represent any of the device(s) described herein. For example, the device 1300 may represent one of the client computing devices 1206 or the device(s) 1210.

As illustrated, the device 1300 includes one or more data processing unit(s) 1302, computer-readable media 1304, and communication interface(s) 1306. The components of the device 1300 are operatively connected, for example, via a bus 1309, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1302 and/or data processing unit(s) 1212, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS-SPs"), System-on-a-Chip Systems ("SOCs"), Complex Programmable Logic Devices ("CPLDs"), etc.

As utilized herein, computer-readable media, such as computer-readable media 1304 and computer-readable media 1214, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, includes computer-readable storage media and/or communication media. Computer-readable storage media may include one or more of volatile memory, nonvolatile memory, and/or other persistent and/or auxiliary computer-readable storage media, removable and non-removable computer-readable storage media implemented in any method or technology for storage of information such as computer-readable instructions, data structures, program modules, or other data. Thus, computer-readable storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media may embody computer-readable instructions, data structures, program modules, or other data in a modulated data signal, such as a carrier wave, or other transmission mechanism. As defined herein, computer-readable storage media does not include communication media. That is, computer-readable storage media does not include communications media consisting solely of a modulated data signal, a carrier wave, or a propagated signal, per se.

Communication interface(s) 1306 may represent, for example, network interface controllers ("NICs") or other types of transceiver devices to send and receive communications over a network.

In the illustrated example, computer-readable media 1304 includes a data store 1308. In some examples, the data store 1308 includes data storage such as a database, data warehouse, or other type of structured or unstructured data storage. In some examples, the data store 1308 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1308 may store data for the operations of processes, applications, components, and/or modules stored in computer-readable media 1304 and/or executed by data processing unit(s) 1302 and/or accelerator(s). For instance, in some examples, the data store 1308 may store session data 1310 (e.g., session data 1236 as shown in FIG. 12), profile data 1312 (e.g., associated with a participant profile), and/or other data. The session data 1310 can include a total number of participants (e.g., users and/or client computing devices) in a communication session, activity that occurs in the communication session, a list of invitees to the communication session, and/or other data related to when and how the communication session is conducted or hosted. The data store 1308 may also include content data 1314, such as the content of communications within the communication session.

Alternately, some or all of the above-referenced data can be stored on separate memory 1316 on board one or more data processing unit(s) 1302 such as a memory on board a CPU-type processor, a GPU-type processor, an FPGA-type accelerator, a DSP-type accelerator, and/or another accelerator. In this example, the computer-readable media 1304 also includes an operating system 1318 and application programming interface(s) 1320 (APIs) configured to expose the functionality and the data of the device 1300 to other devices. Additionally, the computer-readable media 1304 includes one or more modules such as a server module 1322 (e.g., the server module 1230 as shown in FIG. 12), an output module 1324 (e.g., output module 1232 as shown in FIG. 12), and a GUI presentation module 1326 (e.g., GUI presentation module 1240 as shown in FIG. 12), although the number of illustrated modules is just an example, and the number may vary higher or lower. That is, the functionality described herein in association with the illustrated modules may be performed by a fewer number of modules or a larger number of modules on one device or spread across multiple devices.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method to be performed by a data processing system, the method comprising: receiving an indication of a recipient account from a user interface (UI) for composing a message; detecting an organizational change for the recipient account, wherein the organizational change comprises a move from a first group to a second group; generating an auto-response notice indicating the organizational change of the recipient account in response to detecting the organizational change; and causing display of the auto-response notice within the UI for composing the message prior to transmission of the message.

Clause 2. The method of clause 1, wherein detecting the organizational change comprises: sending a request for an organizational change status for the recipient account to a Global Address List (GAL); and receiving an indication of the organizational change from the GAL.

Clause 3. The method of any of clauses 1-2, wherein causing display of the auto-response notice in the UI for composing a message comprises causing display of an alert to a drafter of the message at a location on the UI that is at least partially overlapping a portion of the UI displaying the recipient account.

Clause 4. The method of any of clauses 1-3, wherein the communicating the auto-response notice is further based on identifying an association of the drafter of the message with the first group.

Clause 5. The method of any of clauses 1-4, wherein the message comprises another recipient and generating the auto-response notice if further based on a determination that the other recipient is associated with the first group.

Clause 6. The method of any of clauses 1-5, wherein further comprising: calculating a score for the message based on a plurality of factors including an identity of a drafter of the message or an identity of another recipient of the message; and generating the auto-response notice in response to determining that the score exceeds a threshold value.

Clause 7. The method of clause 6, wherein the score is calculated at least in part by a machine learning model trained on feedback provided from the recipient account regarding previous messages directed to the recipient account.

Clause 8. A system comprising: one or more data processing units; and a computer-readable medium having encoded thereon computer-executable instructions to cause the one or more data processing units to: receive, during composition of a message by a drafter of the message, identification of a recipient account; query an organizational directory for an organizational status of the recipient account; determine that the organizational status of the recipient account indicates a change from association with a first group to association with a second group; calculate a score for the message indicating a likelihood that the message is associated with the first group; determine that the score exceeds a threshold value; and cause display of an auto-response notice to the drafter of the message prior to transmission of the message, the auto-response notice indicating a change in the organizational status of the recipient account.

Clause 9. The system of clause 8, wherein the score is based on an identity of the drafter of the message, an identity of one or more other recipients of the message, or content of the message.

Clause 10. The system of any of clauses 8-9, wherein the first group is associated with one or more keywords and the score is based on a presence of the one or more keywords in the message.

Clause 11. The system of any of clauses 8-10, wherein content of the auto-response notice is based on the first group.

Clause 12. The system of any of clauses 8-11, wherein the score and the threshold value are both determined at least in part by a machine learning model trained with feedback provided from the recipient account identifying previous messages as associated with the first group or not associated with the first group.

Clause 13. The system of any of clauses 8-12, wherein the instructions further cause the one or more data processing units to: determine that the score exceeds a second threshold value; and modify the auto-response notice in response to the score exceeding the second threshold value.

Clause 14. The system of clause 13, wherein the instructions further cause the one or more data processing units to prevent sending of the message to the recipient account in response to the score exceeding the second threshold value.

Clause 15. A system comprising: means for receiving an indication of a recipient account from a user interface (UI) for composing a message; means for detecting an organizational change from a first group to a second group associated with a recipient account; means for determining that content of the message is related to the first group; means for communicating an auto-response notice in response to determining that message is related to the first group; and means for causing display of the auto-response notice within the UI prior to transmission of the message.

Clause 16. The system of clause 15, wherein the means for determining that content of the message is related to the first group includes analyzing organizational associations for another recipient of the message.

Clause 17. The system of any of clauses 15-16, wherein the means for determining that content of the message is related to the first group includes performing natural language processing on content of the message.

Clause 18. The system of any of clauses 15-17, further comprising means for determining a score for the message, the score representing a likelihood that content of the message is associated with the first group, wherein the means for determining that the content of the message is related to the first group is based on the score for the message.

Clause 19. The system of any of clauses 15-18, further comprising means for modifying content of the auto-response notice based on an identity of another recipient of the message.

Clause 20. The system of any of clauses 15-19, further comprising means for determining if a drafter of the message interacted with a previous auto-response notice and generating a modified auto-response notice in response to determining that the drafter of the message interacted with the previous auto-response message.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different virtual machines, etc.).

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

The invention claimed is:

1. A method to be performed by a data processing system, the method comprising:
   receiving an indication of a recipient account from a user interface (UI) for composing a message;
   detecting a change in a data structure reflecting an organizational change for the recipient account, wherein the change in the data structure comprises changing an association of the recipient account from a first group to a second group and the data structure no longer associates the recipient account with the first group due to the organizational change;
   in response to the change in the data structure, generating a notice indicating the organizational change of the recipient account; and
   causing display of the notice within the UI for composing the message prior to transmission of the message.

2. The method of claim 1, wherein detecting the change in the data structure reflecting the organizational change comprises:
   sending a request for an organizational change status for the recipient account to a Global Address List (GAL); and
   receiving an indication of the organizational change from the GAL.

3. The method of claim 1, wherein causing display of the notice in the UI for composing a message comprises causing display of an alert to a drafter of the message at a location on the UI that is at least partially overlapping a portion of the UI displaying the recipient account.

4. The method of claim 1, wherein the communicating the notice is further based on identifying an association of the drafter of the message with the first group.

5. The method of claim 1, wherein the message comprises another recipient and generating the notice is further based on a determination that the other recipient is associated with the first group.

6. The method of claim 1, further comprising:
   calculating a score for the message based on a plurality of factors including an identity of a drafter of the message or an identity of another recipient of the message; and
   generating the notice in response to determining that the score exceeds a threshold value.

7. The method of claim 6, wherein the score is calculated at least in part by a machine learning model trained on feedback provided from the recipient account regarding previous messages directed to the recipient account.

8. A system comprising:
   one or more data processing units; and
   a computer-readable medium having encoded thereon computer-executable instructions to cause the one or more data processing units to:
   receive, during composition of a message by a drafter of the message, identification of a recipient account;
   query an organizational directory for an organizational status of the recipient account;

determine that data in the organizational directory reflecting the organizational status of the recipient account indicates a change of the recipient account from association with a first group to association with a second group and the data no longer associates the recipient account with the first group;

calculate a score for the message indicating a likelihood that the message is associated with the first group;

determine that the score exceeds a threshold value; and cause display of a notice to the drafter of the message prior to transmission of the message, the notice indicating a change in the organizational status of the recipient account.

9. The system of claim 8, wherein the score is based on an identity of the drafter of the message, an identity of one or more other recipients of the message, or content of the message.

10. The system of claim 8, wherein the first group is associated with one or more keywords and the score is based on a presence of the one or more keywords in the message.

11. The system of claim 8, wherein content of the notice is based on the first group.

12. The system of claim 8, wherein the score and the threshold value are both determined at least in part by a machine learning model trained with feedback provided from the recipient account identifying previous messages as associated with the first group or not associated with the first group.

13. The system of claim 8, wherein the instructions further cause the one or more data processing units to:

determine that the score exceeds a second threshold value; and modify the notice in response to the score exceeding the second threshold value.

14. The system of claim 13, wherein the instructions further cause the one or more data processing units to prevent sending of the message to the recipient account in response to the score exceeding the second threshold value.

15. A system comprising:

means for receiving an indication of a recipient account from a user interface (UI) for composing a message;

means for detecting a change in a data structure reflecting an organizational change for the recipient account, wherein the change in the data structure comprises changing an association of the recipient account from a first group to a second group and the data structure no longer associates the recipient account with the first group due to the organizational change;

means for determining that content of the message is related to the first group;

means for communicating a notice in response to determining that the message is related to the first group; and means for causing display of the notice within the UI prior to transmission of the message.

16. The system of claim 15, wherein the means for determining that content of the message is related to the first group includes analyzing organizational associations for another recipient of the message.

17. The system of claim 15, wherein the means for determining that content of the message is related to the first group includes performing natural language processing on content of the message.

18. The system of claim 15, further comprising means for determining a score for the message, the score representing a likelihood that content of the message is associated with the first group, wherein the means for determining that the content of the message is related to the first group is based on the score for the message.

19. The system of claim 15, further comprising means for modifying content of the auto-response notice based on an identity of another recipient of the message.

20. The system of claim 15, further comprising means for determining if a drafter of the message interacted with a previous notice and generating a modified notice in response to determining that the drafter of the message interacted with the previous message.

* * * * *